US012771412B2

(12) United States Patent
Singh et al.

(10) Patent No.: US 12,771,412 B2
(45) Date of Patent: Oct. 20, 2026

(54) MONOLITHIC BUTLER MATRIX FOR BEAMFORMING APPLICATIONS UTILIZING NONVOLATILE RADIO FREQUENCY SWITCHES AND PLANAR WIDEBAND COUPLERS

(71) Applicant: Dell Products L.P., Round Rock, TX (US)

(72) Inventors: Tejinder Singh, Manotick (CA); Navjot Kaur Khaira, Manotick (CA)

(73) Assignee: DELL PRODUCTS L.P., Round Rock, TX (US)

(*) Notice: Subject to any disclaimer, the term of this patent is extended or adjusted under 35 U.S.C. 154(b) by 30 days.

(21) Appl. No.: 18/968,905

(22) Filed: Dec. 4, 2024

(65) Prior Publication Data

US 2026/0155865 A1 Jun. 4, 2026

(51) Int. Cl.

| | |
|---|---|
| ***H04B 7/0426*** | (2017.01) |
| ***H01Q 13/08*** | (2006.01) |
| ***H01Q 21/00*** | (2006.01) |

(52) U.S. Cl.

CPC ............. *H04B 7/043* (2013.01); *H01Q 13/08* (2013.01); *H01Q 21/0093* (2013.01)

(58) Field of Classification Search

CPC ..... H04B 7/043; H01Q 13/08; H01Q 21/0093

See application file for complete search history.

(56) References Cited

U.S. PATENT DOCUMENTS 3,827,055 A * 7/1974 Bogner .................. H01Q 3/242 343/754
3,839,720 A * 10/1974 Reindel .................... H01Q 3/40 342/373

(Continued)

FOREIGN PATENT DOCUMENTS

BR 102018009865 A2 * 12/2018 ........... H04B 7/0408
BR 112019021133 A2 * 5/2020 ............... H01Q 3/20

(Continued)

OTHER PUBLICATIONS

Y. Wang, K. Ma and Z. Jian, "A Low-Loss Butler Matrix Using Patch Element and Honeycomb Concept on SISL Platform," in IEEE Transactions on Microwave Theory and Techniques, vol. 66, No. 8, pp. 3622-3631, Aug. 2018, (Year: 2018).*

(Continued)

*Primary Examiner* — Berhanu Tadese

(74) *Attorney, Agent, or Firm* — Amin, Turocy & Watson, LLP

(57) ABSTRACT le;2qThe technology described herein is directed towards Butler matrix that can be implemented in a monolithic planar structure design for low-cost and scalable manufacturing. One implementation design is for a device that integrates the quadrature couplers, crossover couplers, and fixed phase-shift meandered lines of the Butler matrix, with a switch and an antenna array in a planar layout that eliminates the need for multiple layers of metallization. The implementation uses monolithic nonvolatile phase change material-based radio frequency (RF) switch elements for dynamic beamforming, by routing RF signals through the Butler matrix based on controlling conductive and nonconductive states of the phase change material corresponding to selectable switch ports. This facilitates dynamic, power-efficient reconfiguration within the Butler Matrix for flexible beam steering. Also described are ultra-wideband quadrature couplers and crossover couplers with parametric design optimization variables, which facilitates ultra-compact device designs.

20 Claims, 23 Drawing Sheets

(56) References Cited

U.S. PATENT DOCUMENTS

| | | | | |
|---|---|---|---|---|
| 4,257,050 | A * | 3/1981 | Ploussios | H01Q 3/40 |
| | | | | 342/372 |
| 4,814,773 | A * | 3/1989 | Wechsberg | G01S 7/03 |
| | | | | 342/368 |
| 7,006,849 | B2 * | 2/2006 | Li | H04B 7/086 |
| | | | | 455/562.1 |
| 7,239,219 | B2 * | 7/2007 | Brown | B81C 1/00126 |
| | | | | 333/156 |
| 7,474,263 | B1 * | 1/2009 | Garfinkle | H01Q 3/36 |
| | | | | 342/372 |
| 7,868,818 | B2 * | 1/2011 | Henderson | H01Q 19/32 |
| | | | | 342/149 |
| 8,063,822 | B2 * | 11/2011 | Adams | H01Q 3/00 |
| | | | | 342/368 |
| 8,362,955 | B2 * | 1/2013 | Adams | H01Q 3/26 |
| | | | | 342/368 |
| 8,467,363 | B2 * | 6/2013 | Lea | H01Q 1/246 |
| | | | | 455/562.1 |
| 8,743,914 | B1 * | 6/2014 | Jensen | H04B 7/086 |
| | | | | 370/537 |
| 8,824,442 | B2 * | 9/2014 | Lea | H01Q 1/246 |
| | | | | 455/562.1 |
| 8,928,528 | B2 * | 1/2015 | Harel | H01Q 3/26 |
| | | | | 342/373 |
| 9,001,809 | B2 * | 4/2015 | Lea | H01Q 1/246 |
| | | | | 455/461 |
| 9,178,558 | B2 * | 11/2015 | Lea | H01Q 1/246 |
| 9,203,147 | B2 * | 12/2015 | Adams | H01Q 1/246 |
| 9,343,808 | B2 * | 5/2016 | Harel | H01Q 3/40 |
| 9,350,411 | B2 * | 5/2016 | Lea | H01Q 1/246 |
| 9,368,870 | B2 * | 6/2016 | Dayanandan | H01Q 25/008 |
| 9,577,700 | B2 * | 2/2017 | Lea | H01Q 1/246 |
| 9,595,765 | B1 | 3/2017 | Valayil | |
| 9,634,389 | B2 * | 4/2017 | Tseng | H01Q 3/385 |
| 9,712,216 | B2 * | 7/2017 | Lea | H01Q 1/246 |
| 10,135,501 | B2 * | 11/2018 | Lea | H01Q 1/246 |
| 10,243,412 | B1 * | 3/2019 | Fink | H01Q 1/248 |
| 10,566,693 | B2 * | 2/2020 | Tsai | H01Q 3/40 |
| 10,720,969 | B2 * | 7/2020 | Lea | H01Q 1/246 |
| 11,019,506 | B2 * | 5/2021 | Wu | H01Q 19/10 |
| 11,057,019 | B2 * | 7/2021 | El-Hinnawy | H01Q 3/44 |
| 11,114,759 | B1 * | 9/2021 | Horn | H01Q 3/40 |
| 11,196,184 | B2 * | 12/2021 | Jordan | H01Q 21/0093 |
| 11,271,613 | B2 * | 3/2022 | Lea | H01Q 1/246 |
| 11,595,827 | B2 * | 2/2023 | Wu | H01Q 5/48 |
| 11,652,524 | B2 * | 5/2023 | Jam | H01Q 13/10 |
| | | | | 375/267 |
| 11,699,862 | B2 * | 7/2023 | Brown | H01Q 21/061 |
| | | | | 343/702 |
| 11,777,224 | B2 | 10/2023 | Achour et al. | |
| 11,777,225 | B2 | 10/2023 | Chang et al. | |
| 11,917,427 | B2 * | 2/2024 | Wu | H01Q 1/246 |
| 11,923,619 | B2 * | 3/2024 | Horn | H04B 7/0421 |
| 11,936,429 | B2 * | 3/2024 | Ito | H04B 10/25753 |
| 12,027,779 | B1 * | 7/2024 | Brown | H01Q 21/061 |
| 12,218,436 | B2 * | 2/2025 | Ding | H04B 7/0617 |
| 12,237,882 | B1 * | 2/2025 | Madanayake | H04B 1/1607 |
| 12,266,867 | B2 * | 4/2025 | Ding | H04B 7/0617 |
| 2008/0143601 | A1 * | 6/2008 | Xu | H01Q 25/00 |
| | | | | 342/373 |
| 2014/0349637 | A1 * | 11/2014 | Hyde | H01Q 3/00 |
| | | | | 455/419 |
| 2015/0222014 | A1 | 8/2015 | Stevenson et al. | |
| 2020/0071426 | A1 * | 3/2020 | Matsumoto | D21H 21/04 |
| 2020/0373678 | A1 | 11/2020 | Park et al. | |
| 2022/0190884 | A1 * | 6/2022 | Lea | H01Q 1/246 |
| 2024/0079776 | A1 * | 3/2024 | Scarborough | H01Q 3/14 |
| 2024/0097325 | A1 * | 3/2024 | Hu | H01Q 1/2283 |
| 2024/0396213 | A1 * | 11/2024 | Ding | H04B 1/0458 |
| 2025/0239542 | A1 * | 7/2025 | Yang | H01Q 1/2266 |
| 2026/0081672 | A1 * | 3/2026 | Borhani Kakhki | H01Q 3/40 |

FOREIGN PATENT DOCUMENTS

| | | | | | |
|---|---|---|---|---|---|
| CA | 2568136 | C | * | 7/2008 | H01Q 3/40 |
| CA | 2591915 | C | * | 6/2012 | H01Q 21/205 |
| CA | 3003999 | C | * | 7/2019 | H01Q 21/245 |
| CN | 1352490 | A | * | 6/2002 | H04B 7/0408 |
| CN | 1352498 | A | * | 6/2002 | |
| CN | 1129237 | C | * | 11/2003 | H04B 7/088 |
| CN | 1160890 | C | * | 8/2004 | |
| CN | 1540903 | A | * | 10/2004 | |
| CN | 1554136 | A | * | 12/2004 | H01Q 3/00 |
| CN | 1898885 | A | * | 1/2007 | H01Q 25/005 |
| CN | 101091407 | A | * | 12/2007 | H01Q 21/205 |
| CN | 101227216 | A | * | 7/2008 | H01Q 25/00 |
| CN | 100435492 | C | * | 11/2008 | H01Q 1/246 |
| CN | 100488091 | C | * | 5/2009 | |
| CN | 101091407 | B | * | 9/2011 | H04W 16/28 |
| CN | 203386900 | U | * | 1/2014 | |
| CN | 107070526 | A | * | 8/2017 | H04B 7/086 |
| CN | 107230837 | A | * | 10/2017 | H01Q 21/061 |
| CN | 206922018 | U | * | 1/2018 | |
| CN | 107946774 | A | * | 4/2018 | H01Q 25/00 |
| CN | 108155479 | A | * | 6/2018 | H01Q 3/00 |
| CN | 108448221 | A | * | 8/2018 | H01P 5/18 |
| CN | 107946774 | B | * | 11/2018 | H01Q 21/062 |
| CN | 109495189 | A | * | 3/2019 | H04B 17/12 |
| CN | 109509980 | A | * | 3/2019 | H01Q 21/0006 |
| CN | 111430907 | A | * | 7/2020 | H01Q 21/0006 |
| CN | 109495189 | B | * | 8/2020 | H04B 17/12 |
| CN | 107070526 | B | * | 11/2020 | H04B 7/18502 |
| CN | 108448221 | B | * | 12/2020 | H01P 5/18 |
| CN | 112993597 | A | * | 6/2021 | H01Q 23/00 |
| CN | 112993598 | A | * | 6/2021 | H01Q 1/44 |
| CN | 108155479 | B | * | 8/2021 | H01Q 21/24 |
| CN | 112993597 | B | * | 11/2022 | H01Q 3/24 |
| CN | 112993598 | B | * | 11/2022 | H01Q 23/00 |
| CN | 115332790 | A | * | 11/2022 | H01Q 1/50 |
| CN | 116097525 | A | * | 5/2023 | H04B 7/0617 |
| CN | 116325366 | A | * | 6/2023 | H04B 7/06952 |
| CN | 109509980 | B | * | 11/2023 | H01Q 21/0006 |
| CN | 117121293 | A | * | 11/2023 | H01Q 1/246 |
| CN | 107230837 | B | * | 12/2023 | H01Q 3/247 |
| CN | 117546362 | A | * | 2/2024 | H01Q 1/00 |
| CN | 117937095 | A | * | 4/2024 | H01P 5/16 |
| CN | 115332790 | B | * | 9/2024 | H01Q 21/0006 |
| CN | 116325366 | B | * | 1/2025 | H04B 7/06952 |
| CN | 115548680 | B | * | 1/2026 | H01Q 3/30 |
| EP | 0718911 | A1 | * | 6/1996 | H01Q 3/26 |
| EP | 1341315 | A1 | * | 9/2003 | H04B 7/088 |
| EP | 1341315 | B1 | * | 3/2009 | H04B 7/086 |
| EP | 1832135 | B1 | * | 8/2012 | H01Q 1/246 |
| EP | 2925040 | A1 | * | 9/2015 | H01Q 3/00 |
| EP | 3553887 | A1 | * | 10/2019 | H01Q 21/245 |
| EP | 4340123 | A1 | * | 3/2024 | H01Q 21/08 |
| EP | 3783738 | B1 | * | 7/2025 | H01Q 3/24 |
| GB | 2555380 | A | * | 5/2018 | G01S 5/0244 |
| GB | 2556030 | A | * | 5/2018 | H01Q 3/26 |
| GB | 2556031 | A | * | 5/2018 | G01S 5/0295 |
| GB | 2556033 | A | * | 5/2018 | G01S 3/20 |
| GB | 2556034 | A | * | 5/2018 | H01Q 3/00 |
| GB | 2556340 | A | * | 5/2018 | H04B 7/0469 |
| GB | 2622926 | A | | 4/2024 | |
| JP | H06326510 | A | * | 11/1994 | H01Q 21/065 |
| JP | H09284035 | A | * | 10/1997 | |
| JP | H11251821 | A | * | 9/1999 | |
| KR | 20070112111 | A | * | 11/2007 | H01Q 3/00 |
| KR | 20200071426 | A | * | 6/2020 | H01Q 3/26 |
| KR | 102251287 | B1 | * | 5/2021 | H01Q 3/2658 |
| KR | 20220032015 | A | * | 3/2022 | H01Q 19/06 |
| KR | 20230040987 | A | * | 3/2023 | H04B 7/06952 |
| KR | 20230048025 | A | * | 4/2023 | H01Q 3/40 |
| TW | 443004 | B | * | 6/2001 | H01Q 21/061 |
| TW | 474072 | B | * | 1/2002 | H04W 16/28 |
| TW | 202207647 | A | * | 2/2022 | H01Q 3/40 |
| TW | 202418771 | A | * | 5/2024 | H05K 1/115 |
| TW | I904165 | B | * | 11/2025 | H04B 7/0617 |
| WO | WO-0117065 | A1 | * | 3/2001 | H04W 16/28 |

(56) References Cited

FOREIGN PATENT DOCUMENTS

| | | | | | |
|---|---|---|---|---|---|
| WO | WO-0243256 | A1 | * | 5/2002 | H04B 7/0408 |
| WO | WO-03007420 | A1 | * | 1/2003 | H01Q 3/00 |
| WO | WO-2006071154 | A1 | * | 7/2006 | H04W 16/30 |
| WO | WO-2014114252 | A1 | * | 7/2014 | H04B 7/0617 |
| WO | WO-2015142723 | A1 | * | 9/2015 | H01Q 1/1228 |
| WO | WO-2018060660 | A1 | * | 4/2018 | H04B 7/0469 |
| WO | WO-2018060662 | A1 | * | 4/2018 | G01S 5/08 |
| WO | WO-2018060664 | A1 | * | 4/2018 | H01Q 3/00 |
| WO | WO-2018103677 | A1 | * | 6/2018 | H01Q 3/00 |
| WO | WO-2018173761 | A1 | * | 9/2018 | C08B 15/04 |
| WO | WO-2019034118 | A1 | * | 2/2019 | H01Q 25/00 |
| WO | WO-2019047831 | A1 | * | 3/2019 | H04B 17/12 |
| WO | WO-2021106041 | A1 | * | 6/2021 | H04B 10/25759 |
| WO | WO-2021252929 | A1 | * | 12/2021 | H04B 7/06952 |
| WO | WO-2022035490 | A1 | * | 2/2022 | H04B 7/0617 |
| WO | WO-2022040552 | A2 | * | 2/2022 | H01Q 3/40 |
| WO | WO-2022132392 | A1 | * | 6/2022 | H04B 7/0617 |
| WO | WO-2023274200 | A1 | * | 1/2023 | H04B 7/0413 |
| WO | WO-2023019485 | A1 | * | 2/2023 | H01Q 1/00 |
| WO | WO-2023242921 | A1 | * | 12/2023 | H04B 10/291 |
| WO | WO-2024037229 | A1 | * | 2/2024 | H04B 7/086 |
| WO | WO-2024064503 | A1 | * | 3/2024 | H01Q 3/40 |
| WO | WO-2024118325 | A1 | * | 6/2024 | H01Q 21/061 |
| WO | WO-2024229606 | A1 | * | 11/2024 | H01P 5/16 |
| WO | WO-2025136376 | A1 | * | 6/2025 | H10W 70/635 |

OTHER PUBLICATIONS

L. Van Messem et al., “A 4 × 4 Millimeterwave-Frequency Butler Matrix in Grounded Co-Planar Waveguide Technology for Compact Integration With 5G Antenna Arrays,” in IEEE Transactions on Microwave Theory and Techniques, vol. 71, No. 1, pp. 122-134, Jan. 2023, (Year: 2023).*

H. Ren, B. Arigong, M. Zhou, J. Ding and H. Zhang, “A Novel Design of 4×4 Butler Matrix With Relatively Flexible Phase Differences,” in IEEE Antennas and Wireless Propagation Letters, vol. 15, pp. 1277-1280, 2016, (Year: 2016).*

M. B. Kakhki, A. Z. Ashoor, H. K. Pothula and D. Wessel, “Comparison of Butler Matrix and Rotman Lens Beam-Switching Networks at K-Band,” 2024 IEEE International Symposium on Antennas and Propagation and INC/USNC-URSI Radio Science Meeting (AP-S/INC-USNC-URSI), Firenze, Italy, 2024, pp. 141-142, (Year: 2024).*

Singh et al. “Reconfigurable Metasurface With Integrated Signal Readout Mechanism” U.S. Appl. No. 18/968,803, filed Dec. 4, 2024, 43 pages.

Singh et al. “Nonvolatile Multibit Monolithically Integrated Programable Metasurface” U.S. Appl. No. 18/968,819, filed Dec. 4, 2024, 44 pages.

Singh et al. “Multiport Broadband Monolithic Phase-Change Radio Frequency Switch” U.S. Appl. No. 18/968,887, filed Dec. 4, 2024, 43 pages.

Notice of Allowance received for U.S. Appl. No. 18/968,803 dated Jun. 2, 2026, 12 pages.

* cited by examiner

MONOLITHIC BUTLER MATRIX FOR BEAMFORMING APPLICATIONS UTILIZING NONVOLATILE RADIO FREQUENCY SWITCHES AND PLANAR WIDEBAND COUPLERS

BACKGROUND

A Butler matrix is a type of beamforming network used in phased array antenna systems. A Butler matrix is a passive microwave component that facilitates the distribution of input signals to multiple output ports in a way that generates specific phase shifts. These phase shifts create directional beams, which can be steered by adjusting the input signals.

Current beamforming solutions, including fully digital beamforming and traditional analog phased arrays, often involve high complexity and cost. Digital beamforming provides high precision but requires expensive, power-hungry processing units, making it less suitable for cost-sensitive and low-power applications. Analog beamforming techniques, such as traditional Butler matrices, often require multiple layers of metallization, resulting in increased manufacturing complexity, higher costs, and potential reliability issues.

BRIEF DESCRIPTION OF THE DRAWINGS

The technology described herein is illustrated by way of example and not limited to the accompanying figures in which like reference numerals indicate similar elements and in which.

DETAILED DESCRIPTION

Figure 1:
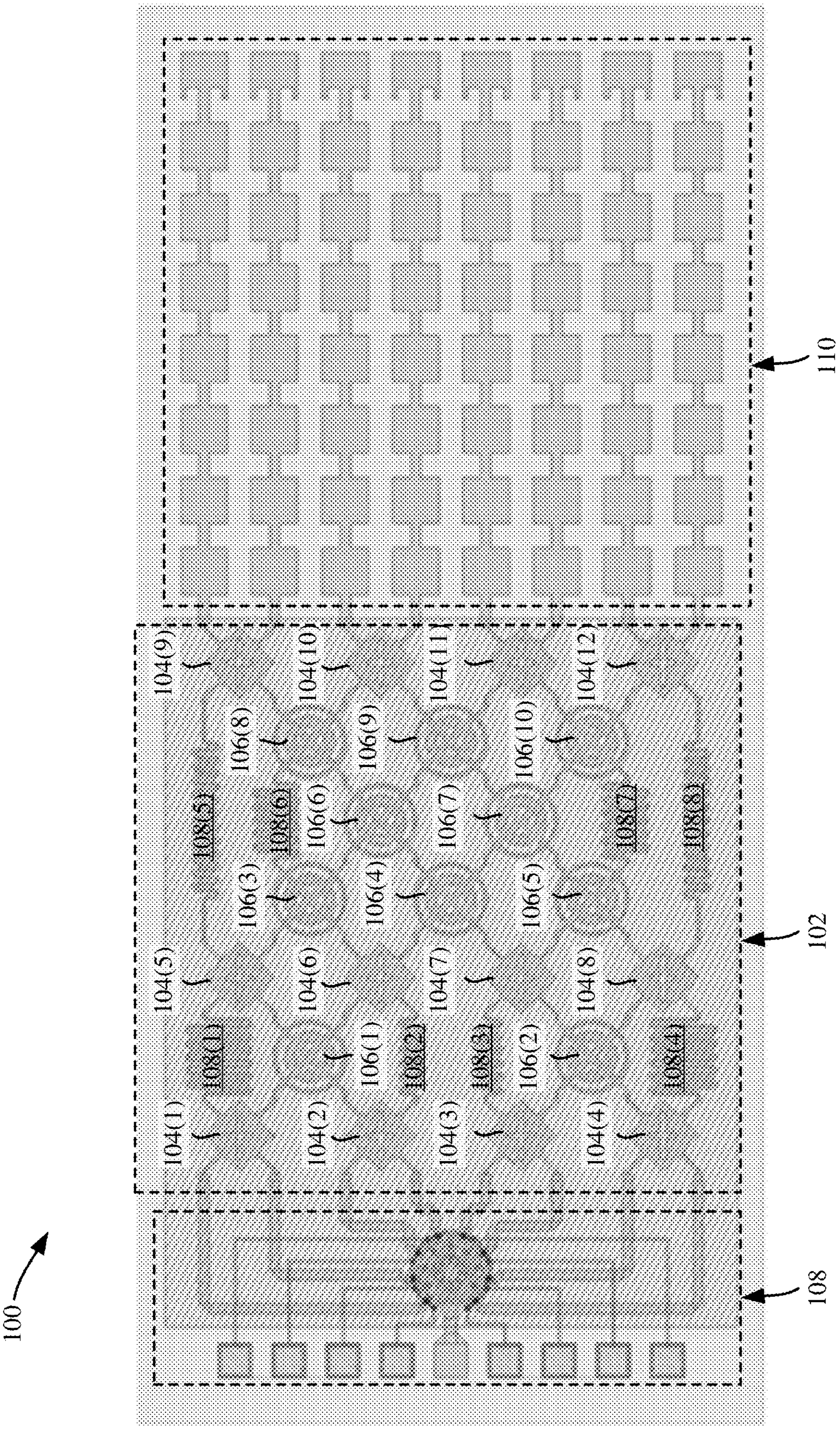
FIG. 1 is top view representation of an example system of a Butler matrix, a switch and an antenna array, in accordance with various embodiments and implementations of the subject disclosure.

The technology described herein is generally directed towards a monolithic planar Butler matrix design, including a nonvolatile radio frequency (RF) switch, and/or planar wideband (quadrature and crossover) couplers. One implementation facilitates low cost and scalable manufacturing by integrating an entire beamforming network, including the Butler matrix, on a single planar layer.

The integration of a nonvolatile switch within the Butler matrix enables dynamic, power efficient reconfiguration within the Butler matrix for flexible beam steering. An ultra-compact design is facilitated, using ultra-wideband quadrature couplers and crossover couplers configured with suitable parametric design optimization variables.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" "between" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

In general, a Butler matrix is a passive microwave component that facilitates the distribution of input signals to multiple output ports in a way that generates specific phase shifts. These phase shifts create directional beams, which can be steered by adjusting the input signals.

A typical Butler matrix includes quadrature couplers, phase shifters, and crossover couplers, organized in a specific configuration to achieve the desired beamforming capabilities.

A Butler matrix works by signal splitting in which input signals are divided using quadrature (hybrid couplers), and phase shifting, in which signals are phase-shifted to control beam direction. Via signal combining, the phase-shifted signals combine to form directional beams. Beam steering results from changing the input or phase shift to steer the beam direction.

The straightforward, passive design of a Butler matrix makes it an affordable solution for beamforming, particularly compared to digital beamforming systems that require complex and costly components. As a passive network, the Butler matrix introduces minimal signal loss, preserving signal integrity and ensuring efficient operation. The Butler matrix can generate multiple beams simultaneously, allowing for enhanced coverage and the ability to serve multiple users or devices at once. The Butler matrix can be easily scaled to fit different system sizes, making it versatile for various applications, from small-scale systems to large communication networks. With no active components, the Butler matrix offers robust and reliable performance, making it suitable for long-term operation in demanding environments.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

The technology described herein includes a monolithic n×n (e.g., 8×8) Butler matrix design. In one example implementation of system 100 that leverages an 8×8 Butler matrix 102 as generally represented in FIG. 1, the Butler matrix 102 includes quadrature couplers 104(1)-104(12), crossover couplers 106(1)-106(10) and delay elements 108(1)-108(8). Each of the quadrature couplers 104(1)-104(12) is a rhombus-shaped quadrature coupler with a cross-shaped slot for wideband response, as shown herein. Each of the parametric-designed crossover couplers 106(1)-106(10) is designed for optimizing bandwidth and center frequency, as described herein.

Figure 8:
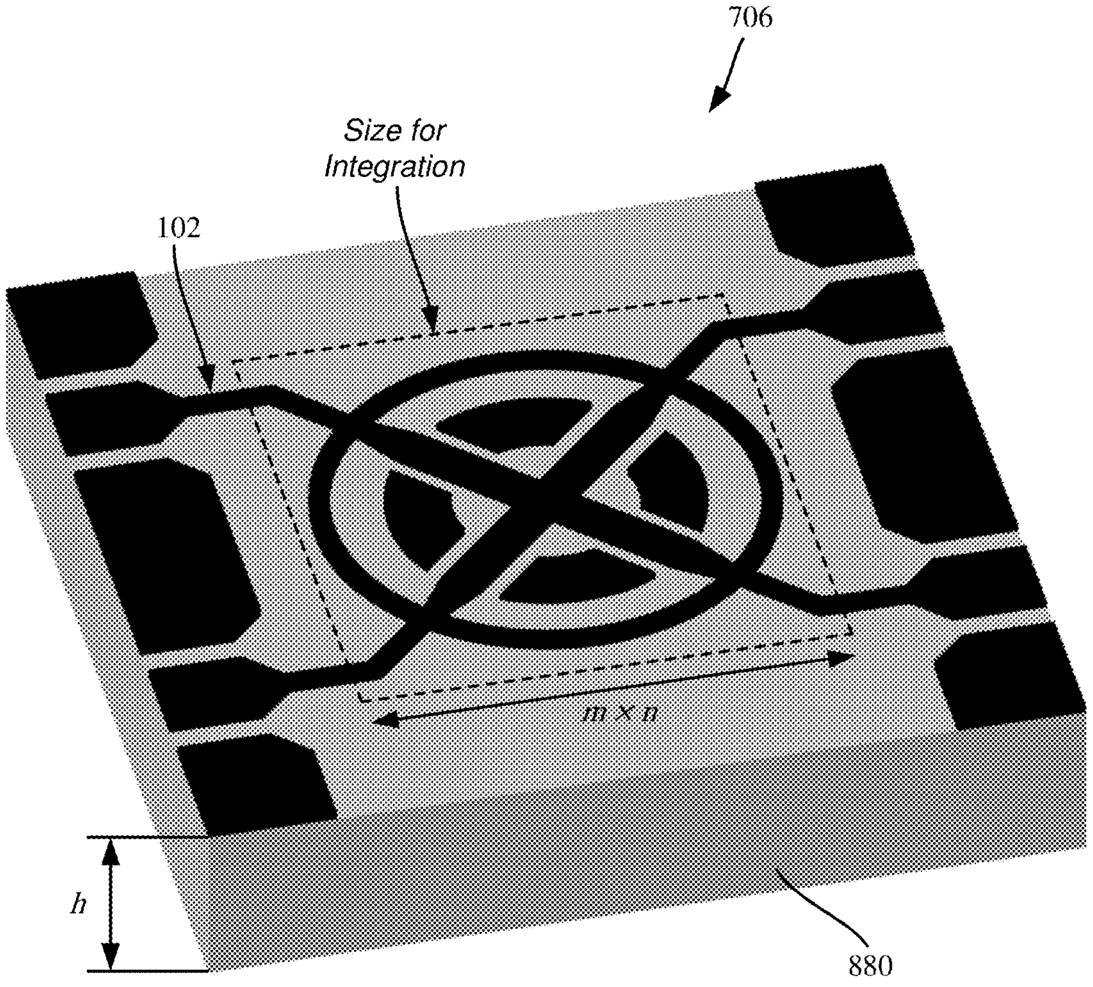
FIG. 8 is a three-dimensional (3D) perspective top view of a model of the crossover coupler corresponding to FIG. 1, in accordance with various embodiments and implementations of the subject disclosure.

The system 100 includes an n-port phase change alloy based RF switch 108, which in the example of FIG. 8 includes a common port and eight individually selectable RF ports, resulting in a single-pole, eight-throw switch. This enables dynamic beam steering by reconfiguring the signal paths within the matrix, using non-volatile phase change alloy switches that retain their state even without power. The system 100 also includes an integrated antenna array 110. As can be readily appreciated, the Butler matrix 102, the switch 108 and the antenna array 110 can be separately assembled, and there can be alternative components, and thus the system 100 is nonlimiting; however, the system 100 in the implementation of FIG. 1 can be fabricated together.

Indeed, the entire system 100 can be realized in a single planar structure, reducing manufacturing costs and complexity while ensuring high reliability. The Butler matrix 102 directs signals to an array of patch antennas, achieving precise beamforming with adjustable phase shifts as demonstrated herein in the performance plots, which show the system's robust frequency response and beam steering capabilities. This low-cost, planar solution is thus extremely suitable for applications in 5G radios, satellite communications, and advanced radar systems, offering scalable, efficient, and reliable beamforming.

As described herein, each of the quadrature couplers includes a top metallization layer with four ports, a metal plane, and a cross-shaped opening in the metal plane, in which the cross-shaped opening includes a first slot and second slot that intersect. In general, the slots efficiently channel E- and H-fields to the ports, overcoming common issues experienced by other quadrature coupler designs, including high loss and inadequate field distribution. Significantly, the quadrature coupler described herein features a broadband capability with a constant bandwidth, significantly simplifying frequency scaling for designers. This allows for the quadrature coupler as described herein to be easily adjusted to desired frequencies without the cumbersome, computationally heavy optimization required by other components, which can take several hours to days. In addition, the technology described herein does not involve any stringent dimensional variabilities, thus reducing the cost of manufacturing significantly.

In one implementation, a compact, passive quadrature circuit is designed with a single-top-layer metal configuration, eliminating the need for any additional interconnect layers. This distinguishes the technology described herein from commercially available couplers and other proposed designs proposed by other researchers. The example design described herein is scalable, and demonstrates low insertion loss at millimeter wave (mmWave) frequencies, achieved through the use of the cross-shaped slots in the coupler's center. By solving the many problems associated with commercially available couplers and those designed by other researchers, such as scalability issues, high insertion losses, and complex optimization processes, the technology described herein offers a streamlined, efficient alternative, and ultra-low-cost solution for mmWave circuits and systems.

Figure 2:
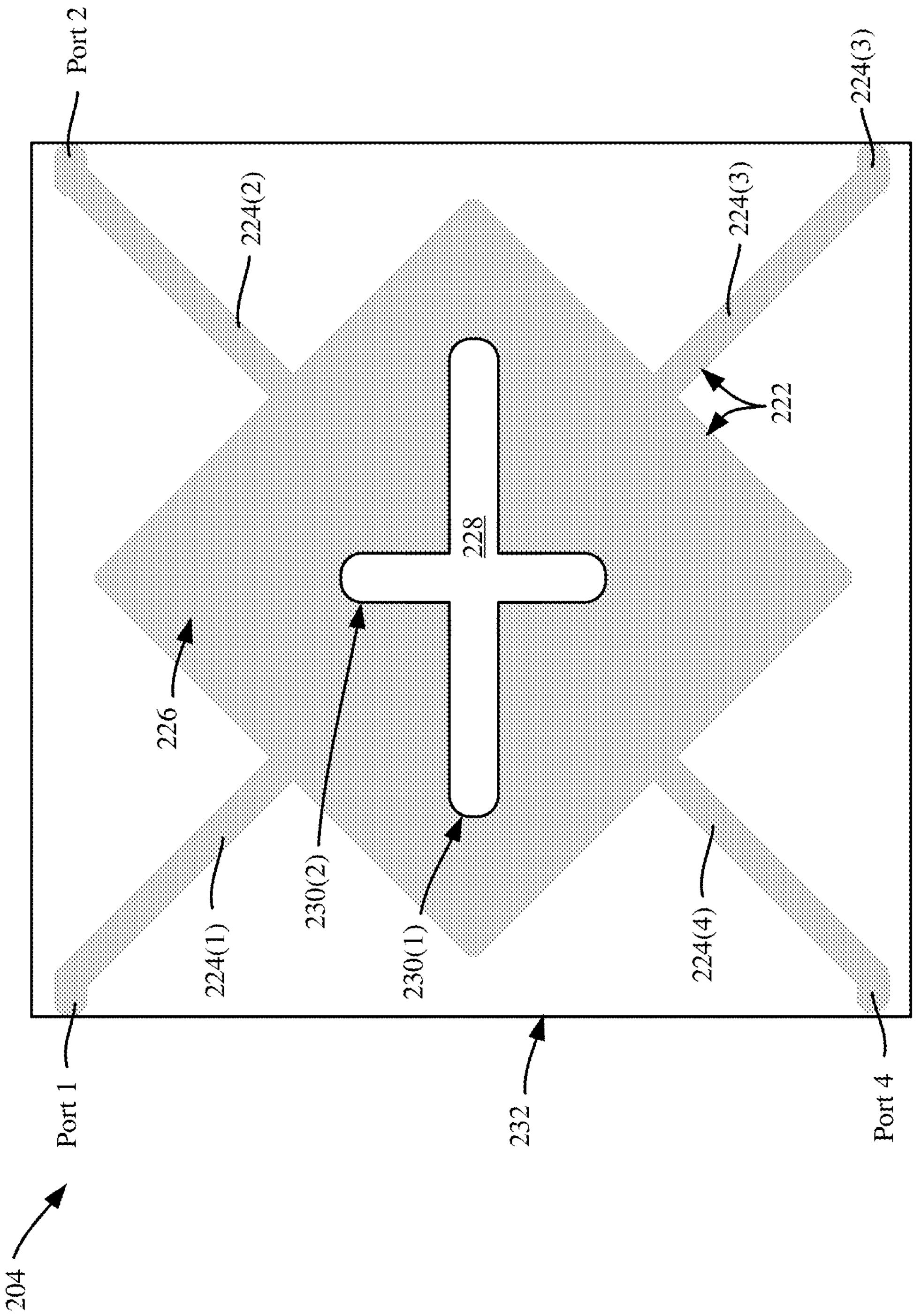
FIG. 2 is top view representation of an example layout of a planar quadrature coupler, showing various design dimensions, in accordance with various embodiments and implementations of the subject disclosure.

More particularly, turning to details of an example quadrature coupler used in the Butler matrix 102 of FIG. 1, FIG. 2 shows a top view of an example wideband quadrature coupler 204 designed using a cross-shaped slot geometry, in which the top metallization layer (e.g., the shaded material) is fabricated via a single-layer metal configuration, e.g., along with the rest of the system 100 of FIG. 1, or with the rest of the Butler matrix 102 of FIG. 1 (if separate from the switch and/or antenna array). Four ports (Port 1-Port 4) including corresponding microstrip lines 224(1)-224(4) are coupled to a metallic plane 226, a portion of the top metallization layer 222. As in general with quadrature couplers, the Port 1 is the input port, the Port 2 is the through port, the Port 3 is the coupled port, and the Port 4 is the isolated port.

The metallic plane 226 includes an opening 228, that is, there is no metal at the area corresponding to the opening 228. The opening 228 includes two slots 230(1) and 230(2).

In one implementation, the four ports (Port 1-Port 4)/microstrip lines 224(1)-224(4) are coupled to the four sides of the metallic plane 226, which is rectangular and substantially square. The slots 230(1) and 230(2) extend towards the corners of the metallic plane 226, substantially perpendicular to one another and diagonal relative to the microstrip lines 224(1)-224(4), and intersect substantially at the center of the metallic plane.

Typically, one of the slots (e.g., 230(1)) can be longer than the other slot (e.g., 230(2)). In general, the angles of the slots relative to the rhombus/diamond are plus and minus forty-five degrees, otherwise the quadrature coupler 202 will not work as well, because of the E-field and H-field disruption.

Figure 3:
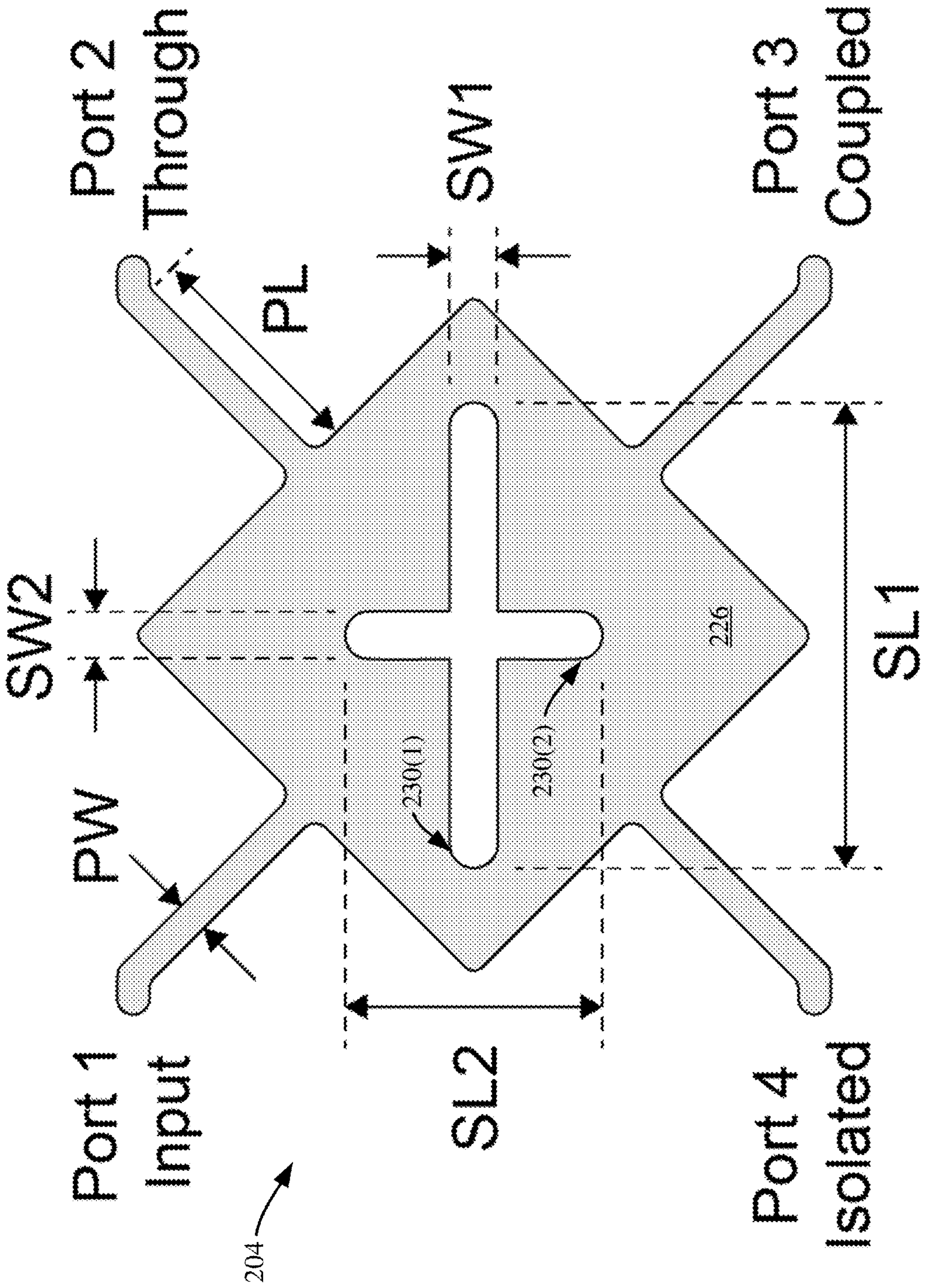
FIG. 3 is top view representation of an example layout of a planar quadrature coupler, showing various design dimensions, in accordance with various embodiments and implementations of the subject disclosure.

FIG. 3 shows design variables of the quadrature coupler 204, for the rhombus/diamond shaped geometry of FIG. 2 with the two cross-shaped slots in the center. The first slot 230(1) has width SW1 and length SL1, while the second slot 230(2) has a width SW2 and length SL1. In general, a quadrature coupler needs four ports, namely, port 1 as an input port, port 2 for through signal, port 3 for coupled signal output with 90° phase difference, and an isolated port 4. The ports' length PL and width PW are chosen in one implementation to have the characteristic impedance of 50Ω but can be varied to accommodate any other impedance (such as if the coupler is required right after an antenna). Exact dimensions are not provided, as this design is scalable and the designer only needs to scale the size of the overall structure to change the frequency band.

Changing the slot width(s) and/or length(s) allow a designer to optimize the RF matching. Note that just scaling the quadrature coupler (with proportional overall dimensions) will not impact the RF matching. However, if the slot length(s) and/or slot width(s) are scaled differently relative to the overall scaling size, the quadrature coupler can be optimized for certain substrate materials. This allows fine tuning the S-parameters (scattering parameters). More than −15 dB of return loss and 3 dB of coupling are desired. Changing the slot length(s) and/or slot width(s) also can increase or decrease the bandwidth limits, to an extent.

Figure 4:
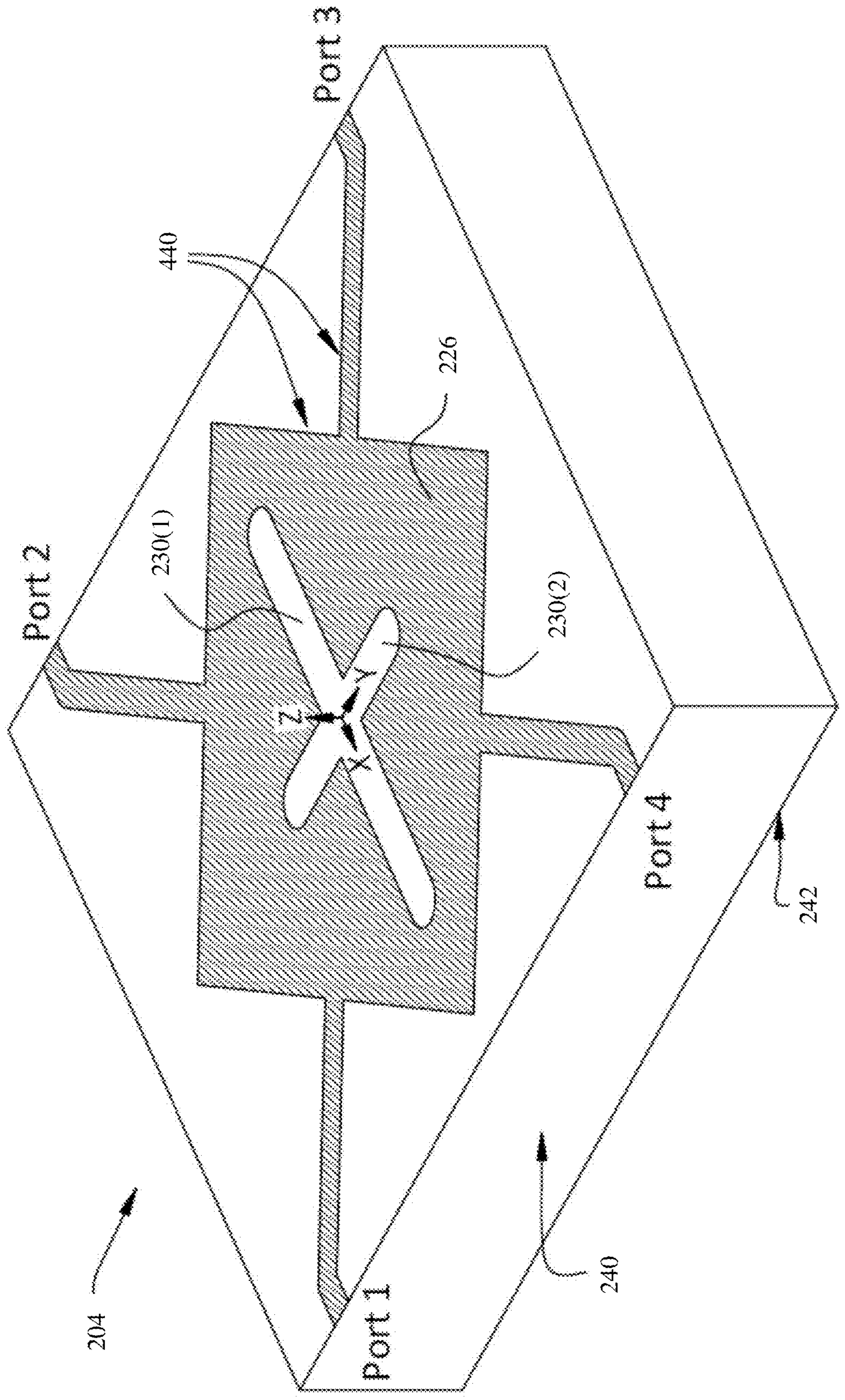
FIG. 4 is a three-dimensional (3D) perspective top view of a model of the quadrature coupler corresponding to FIG. 1, in accordance with various embodiments and implementations of the subject disclosure.

FIG. 4 is a three-dimensional perspective view representation of the example quadrature coupler 100, in which the top metallization layer 4040 is on a substrate 240. Beneath the substrate is a bottom metallization layer 242 that serves as a ground plane. The four ports (Port 1-Port 4), the square metal plane portion 106 and the slots 110(1) and 110(2) are labeled in FIG. 2, as are the X, Y and Z axes.

Figure 5:
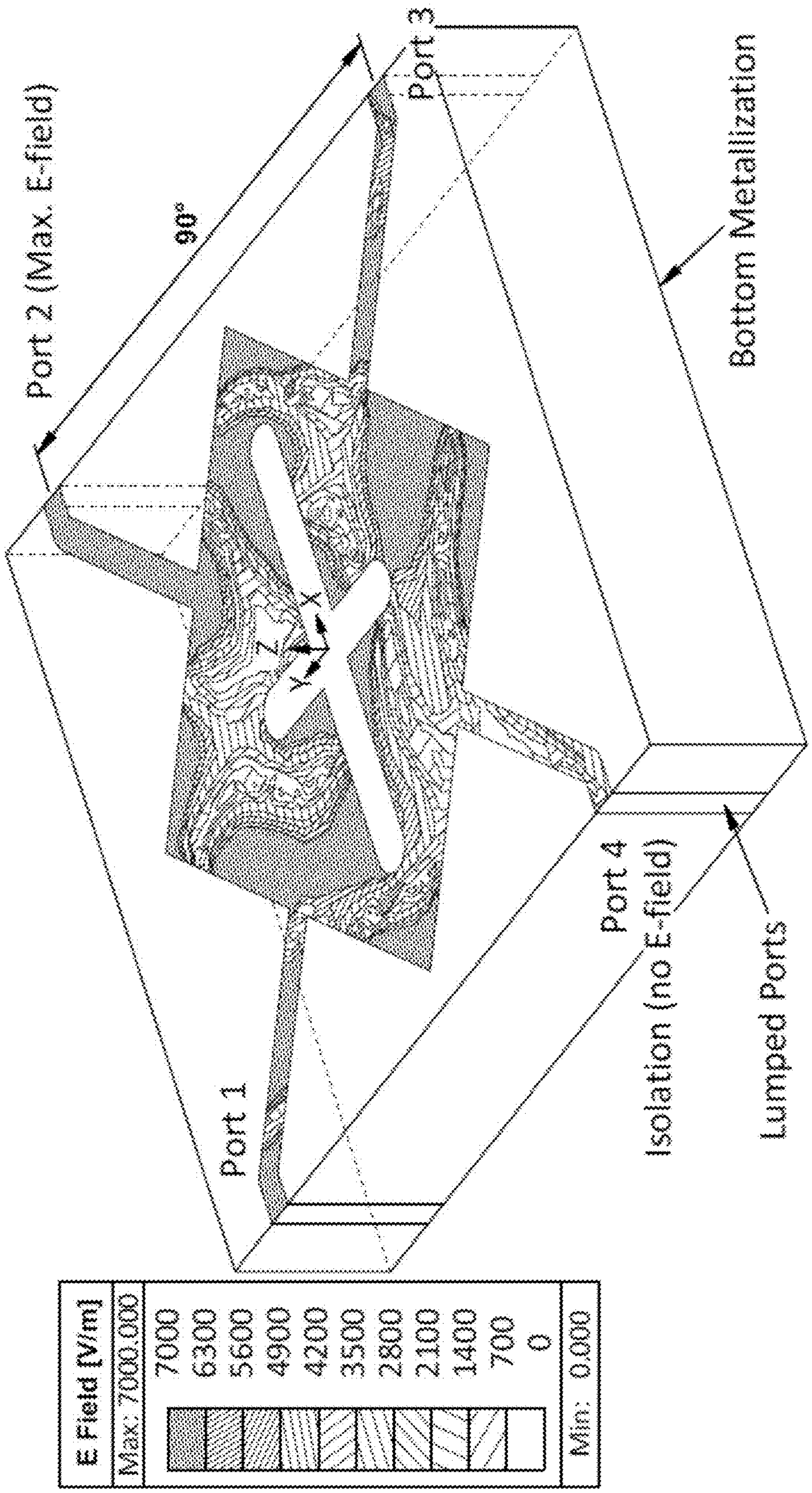
FIG. 5 is a three-dimensional (3D) perspective top view showing simulation of the E-field based on a model of the quadrature coupler corresponding to FIGS. 1-3, in accordance with various embodiments and implementations of the subject disclosure.

FIG. 5 shows simulation of the E-field based on the example coupler design of FIG. 2-4, highlighting signal propagation towards Port 2 and Port 3, while the isolated port (Port 4) is not receiving any signal. The compact quadrature coupler 204 described herein is thus highly appropriate for mmWave systems and technologies such as 5G and beyond; the compact design reduces material and manufacturing costs, while enabling the creation of more sophisticated, higher-density array architectures that are needed for the high-speed, high-capacity demands of future wireless communication systems.

Note that the single top metallization layer quadrature circuit design described herein is in contrast to a typical quadrature circuit, which typically have a very narrow bandwidth in the range of only a few megahertz, which limits their use for broadband applications, such as 5G-advanced or 6G applications where significantly larger bandwidth is needed. Indeed, as the telecommunications industry advances towards higher frequencies to meet the increasing demand for bandwidth, the design and implementation of RF components pose new challenges. Among these, quadrature couplers, needed for phase-sensitive applications such as RF mixers, modulators, and antenna feed networks, face significant limitations. Traditional quadrature couplers, while effective at lower frequencies, are unable to adequately maintain performance across the wide bandwidths needed by millimeter-wave applications.

To simulate in a 3D field solver, ports need to be defined as shown in FIG. 5. One implementation chose lumped ports with 50Ω characteristic impedance and 30 dBm of input RF power. A scalable radiation box was designed to accommodate the study of E- and H-field. For this design, a standard Rogers 4000 series substrate was chosen, but for different substrate materials such as FR4 laminates, alumina, silicon, glass, or any other dielectric material, the quadrature coupler can be optimized by only varying the slot width and length of both slots, which can be in addition to varying port width and port length, and which can be parametrized to achieve desired performance for a specific dielectric constant and loss tangent.

Figure 6A:
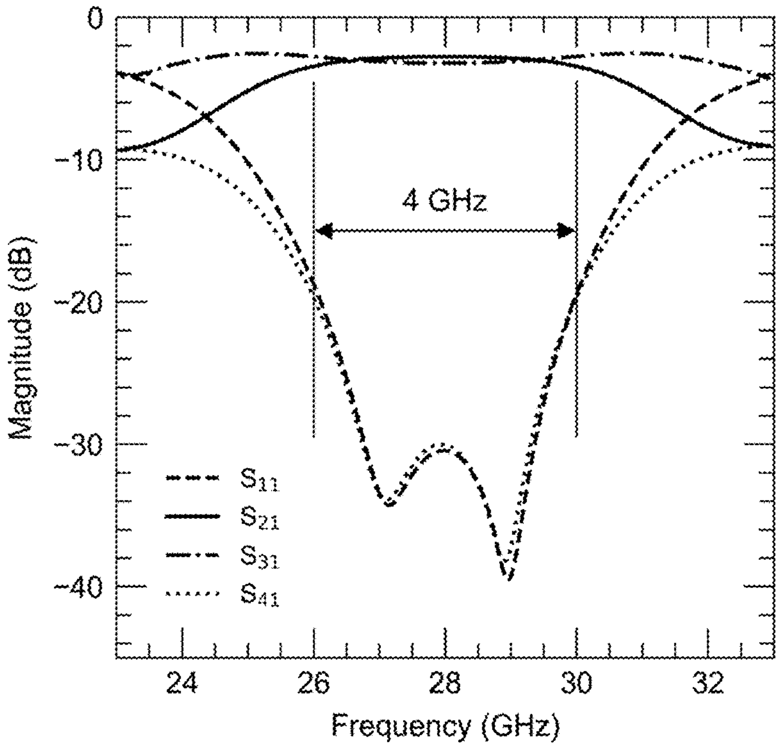
FIG. 6A is a graphical representation of a simulation response of the example quadrature coupler designed with a constant 4 GHz bandwidth and a 28 GHz center frequency, showing scattering parameters (S-parameters) for frequency versus magnitude, in accordance with various example embodiments and implementations of the subject disclosure.
Figure 6B:
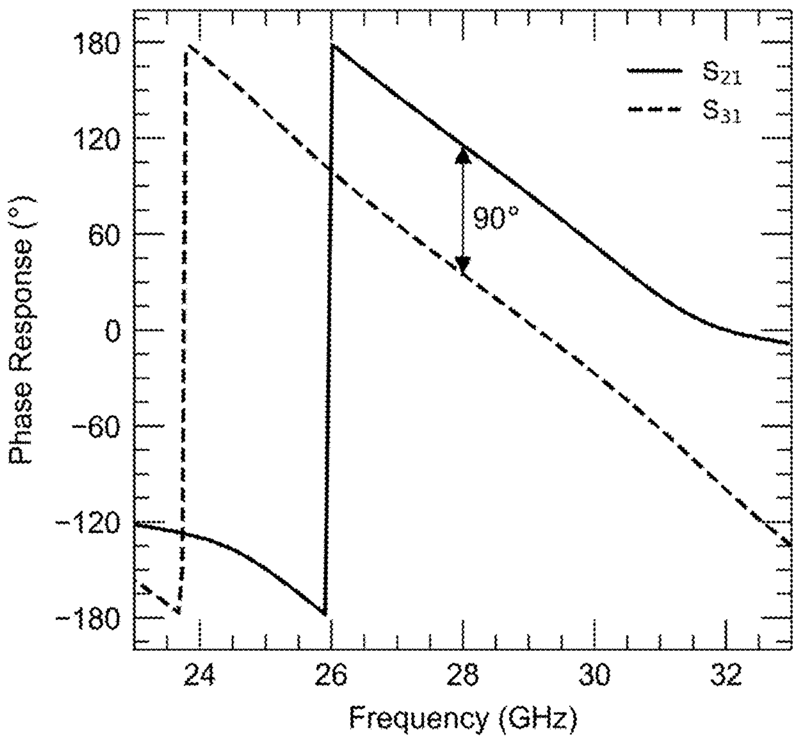
FIG. 6B is a graphical representation of a simulation response of the example quadrature coupler designed with a constant 4 GHz bandwidth and a 28 GHz center frequency, showing S-parameters for frequency versus phase response, in accordance with various example embodiments and implementations of the subject disclosure.

The EM simulation response (magnitude and phase response) of the quadrature coupler is shown in FIGS. 6A and 6B and demonstrates excellent RF performance over 4 GHz bandwidth with 28 GHz center frequency. The S-parameter magnitudes for varying frequencies are shown in FIG. 6A. The phase response (FIG. 6B) shows phase profile lines over the band with constant 90° phase different between port 2 and 3. The bandwidth of the quadrature coupler is dictated when the $S_{21}$ and $S_{31}$ is 3 dB (a 50:50 split).

A low insertion loss can be seen in FIG. 6A from $S_{21}$, the signal flowing from port 1 to 2, and $S_{31}$, the signal flowing from port 1 to 3. The $S_{11}$ is below 20 dB over the band, iterating a near ideally matched circuit with no reflections, and $S_{41}$ better than −20 dB, demonstrating better isolation. In fact, in the design described herein, the isolation is better than 22 dB over the band, in contrast to commercially available couplers that have isolation of 17 dB. The through (port 2) and coupled (port 3) show strong 3 dB coupling, which is a highly desirable trait of a quadrature coupler; to reiterate, a 3 dB difference means equal split of the signal (50:50) between two ports, and an insertion loss is any loss above 3 dB value. In the design described herein, the loss of the coupler is lower than 0.5 dB over the entire band.

When the coupler is scaled a bit larger than the designed X-Y dimensions corresponding to FIGS. 6A and 6B, the center frequency can be tuned while keeping the bandwidth consistent. Conversely, when the X-Y dimensions are shrunken, the center frequency is increased from 28 to 29 GHz, while still keeping the constant 4 GHz bandwidth and balanced 90° phase difference.

Figure 7:
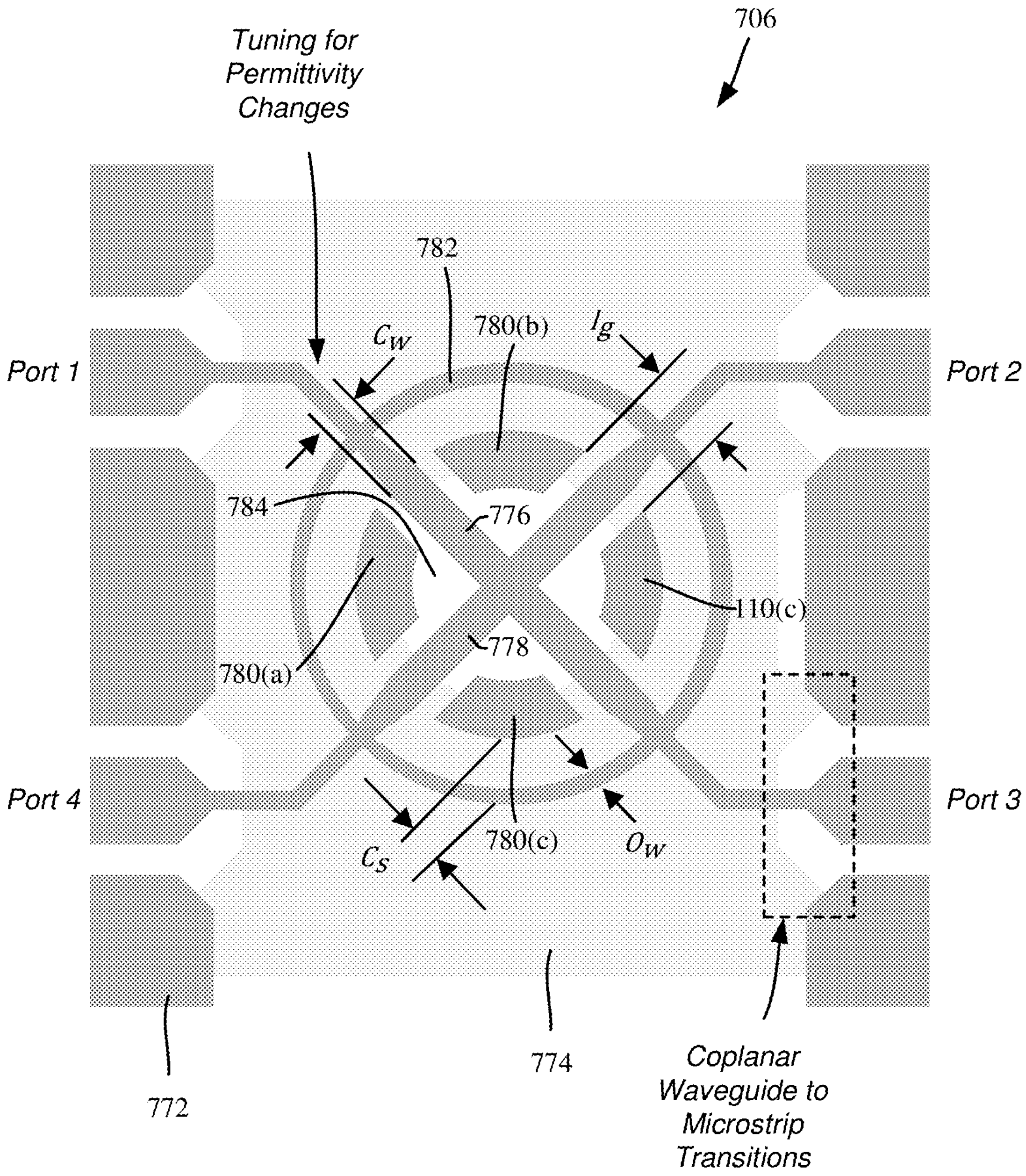
FIG. 7 is a top view representation of an example layout of a planar crossover coupler, showing various design dimensions, in accordance with various embodiments and implementations of the subject disclosure.

Turning to details of an example wideband crossover coupler used in the Butler matrix 102 of FIG. 1, FIG. 7 shows a top view of an example wideband crossover coupler 706 designed using a cross-shaped geometry, in which the top metallization layer (e.g., the darker shaded material 772) and the bottom metallization layer (e.g., the lighter shaded material 774) are each fabricated via a single-layer metal configuration on top of (FIGS. 7 and 8) and beneath a substrate 880 (FIG. 8), respectively. In the example wideband crossover coupler 706, two sets of opposite ports (ports 1 and 3, and ports 2 and 4) intersect via crossing, substantially perpendicular microstrip lines 776 and 778, surrounded by four metallic inner partial couplers 780(*a*)-780(*d*) consolidated within a metallic outer ring 782. Each microstrip line can be considered as having two segments, e.g., the microstrip line 776 has one segment coupled to port 1, and the other coupled to port 3. Adjacent pairs of the four metallic inner partial couplers 780(*a*)-780(*d*) are distributed between two adjacent segments of the four segments. The unshaded (e.g., circular) area is a cutout 784 (non-metallic portion) in the bottom metallization layer 774 as described with reference to FIG. 9. Significantly, no interconnecting layer is required, and the example crossover coupler 770 is passive, needing no powered components.

As will be understood, the example design described herein facilitates specifications and material variations that are straightforward to implement with design tweaks. These include, but are not limited to, any change in the substrate permittivity, which can be optimized by changing the $C_w$ variable (width of the middle cross intersection portion). The coupling strength can be optimized by changing the gap dimensions $C_s$ between the inner partial couplers 780(*a*)-780(*d*) and the outer ring 782. The width $O_w$ of the outer ring 782, and the gap $l_g$ between adjacent inner partial couplers 780(*a*)-780(*d*) allow precise bandwidth tuning.

Figure 9:
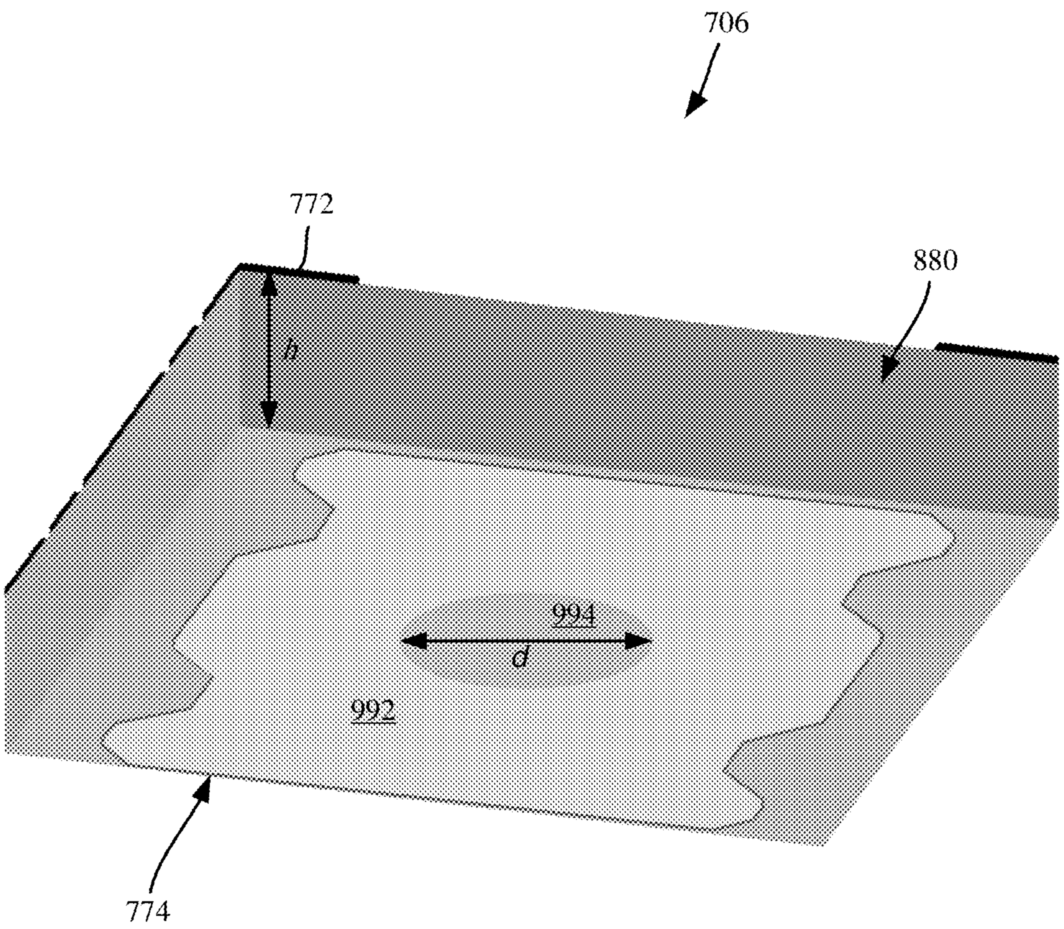
FIG. 9 is a 3D perspective bottom view of the underside of the crossover coupler corresponding to FIGS. 7 and 8, highlighting a cutout in a bottom metallization layer, in accordance with various embodiments and implementations of the subject disclosure.

The three-dimensional top perspective view and bottom perspective views are depicted in FIGS. 8 and 9, respectively. Although, the layout shown in FIGS. 7-9 shows coplanar waveguide-to-microstrip transitions, which allows using the crossover coupler 706 as a standalone interconnect-less device, the overall size of the crossover coupler 706 can be configured for integration with other radio frequency (RF) components, as denoted by the "m×n" dashed line in FIG. 8.

As shown in FIG. 9, the bottom metallic plane 992 fabricated as part of the bottom metallization layer 774 has the (e.g., circular) cutout 994 of diameter d, (through which part of the bottom of the substrate 880 can be seen in FIG. 9), allowing designers to mitigate any RF mismatch, e.g., via intentional EM fields' discontinuity underside the crossover core. The diameter d of the cutout 994 in the bottom metallization plane 992 (FIG. 9) can also be tweaked for any change in the substrate height, h. The bottom metallic plane 992 and/or the cutout 994 are not limited to any particular shape, and indeed, the bottom metallic plane 992 can span the entire length and/or width of the bottom of the substrate 880, minus any portion for the cutout 994; note that in the Butler matrix 102 of FIG. 1, each crossover coupler can have a suitable cutout area in the ground plane beneath the area of the crossover coupler.

In one example implementation, the length and width of the ports (ports 1-4 in FIG. 1) are chosen to have a characteristic impedance $Z_0$ of 50Ω, but can be varied to accommodate any other impedance (such as if the wideband crossover coupler 100 is used right after an antenna). Specific dimensions are not provided, as this design is scalable, whereby the designer only needs to scale the size of the overall structure (m×n) to change the center frequency while still keeping the same bandwidth, e.g., based on the width $O_w$ of the outer ring 782 and/or the gap $l_g$ between adjacent pairs of the inner partial couplers 780(*a*)-780(*d*).

The compact crossover coupler 706 described herein is thus highly appropriate for mmWave systems and technologies such as 5G and beyond; the compact design reduces material and manufacturing costs, while enabling the creation of more sophisticated, higher-density array architectures that are needed for the high-speed, high-capacity demands of future wireless communication systems.

To simulate in a 3D field solver (e.g., Ansys HFSS), the design of FIGS. 7 and 9 was used, in which the ports were defined as lumped ports, chosen with 50Ω characteristic impedance and 30 dBm of input RF power injected in the port 1. A scalable radiation box was designed to accommodate the study of E- and H-field. For this design, a standard Rogers 4000 series substrate was chosen, but for different substrate materials such as FR4 laminates, alumina, silicon, glass, or any other dielectric material, the crossover coupler can be optimized by only varying the design parameters as described herein to keep consistent RF performance. Design parameters can be parametrized to achieve desired performance for a specific dielectric constant and loss tangent.

Figure 10:
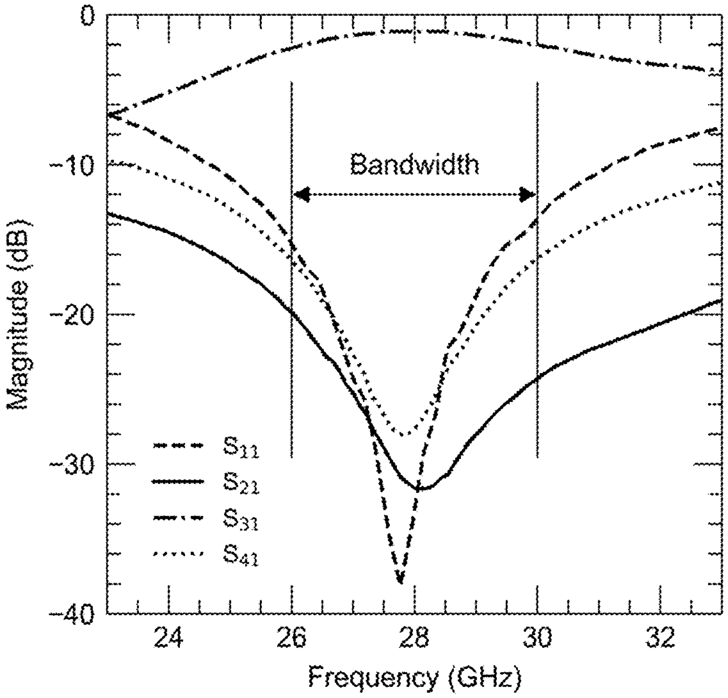
FIG. 10 is a graphical representation of a simulation response of the example crossover coupler designed with a 4 GHz bandwidth and a 28 GHz center frequency, in accordance with various example embodiments and implementations of the subject disclosure.

As can be seen in FIG. 10, for a center frequency around 28 GHz, a wide 4 GHz band was achieved with respect to the various S-parameters via the example design, that is, the EM simulation response of the crossover coupler shows a fully matched wideband signal crossover with minimum transmission loss, demonstrating excellent RF performance over the desired 4 GHz bandwidth and 28 GHz center frequency. A low crossover insertion loss can be seen from $S_{31}$, which is the signal flowing from port 1 to 3 (crossover). The $S_{11}$, $S_{21}$, and $S_{41}$, are below-15 dB over the band, iterating less than three percent of reflections and/or more than ninety-seven percent of isolation. Indeed, with this example design, the isolation is better than 25 dB over the band, in contrast to commercially available couplers, which have isolation of 13-15 dB. In the example design described herein, the loss of the crossover is lower than 0.7 dB over the entire band. In sum, the example design, which is straightforward to implement and tweak, is thus highly suitable for wide bandwidth and high frequency applications.

Turning to details of the multiport RF switch device 108 of FIG. 1 that utilizes phase-change alloy, the switch device 108 offers a compact and efficient design, such as for broadband applications. As described herein, the switch device 108 includes integrated phase change (e.g., chalcogenide) material that can be controllably toggled between higher resistance and lower resistance states, enabling efficient signal routing with minimal insertion loss and high isolation.

Figure 11:
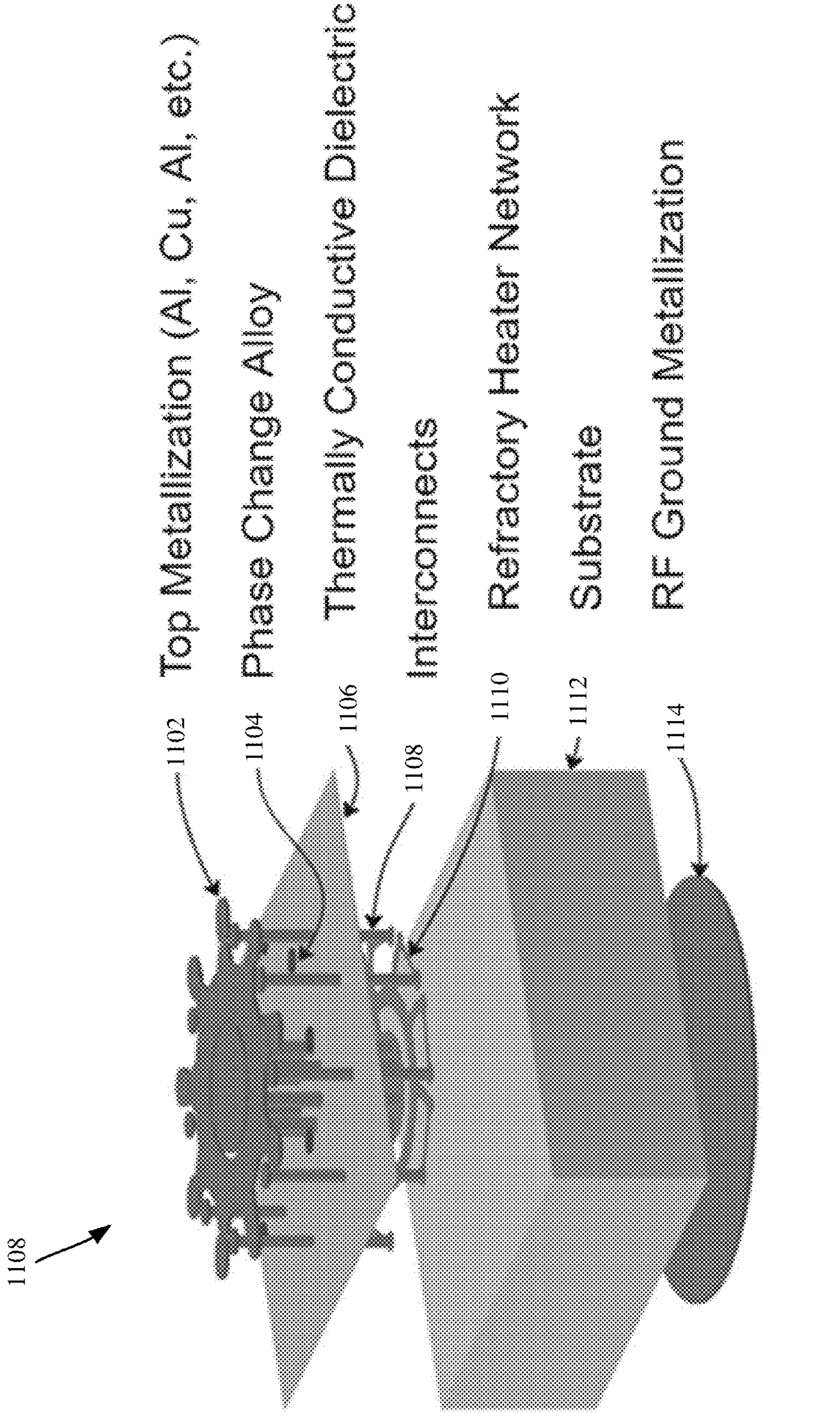
FIG. 11 is an exploded three-dimensional (3D) view representation of an example multi-layer structure of a model of a multiport broadband radio frequency (RF) switch device in which switching is achieved by using phase change alloy (chalcogenide) material junctions, in accordance with various embodiments and implementations of the subject disclosure.
Figure 12A:
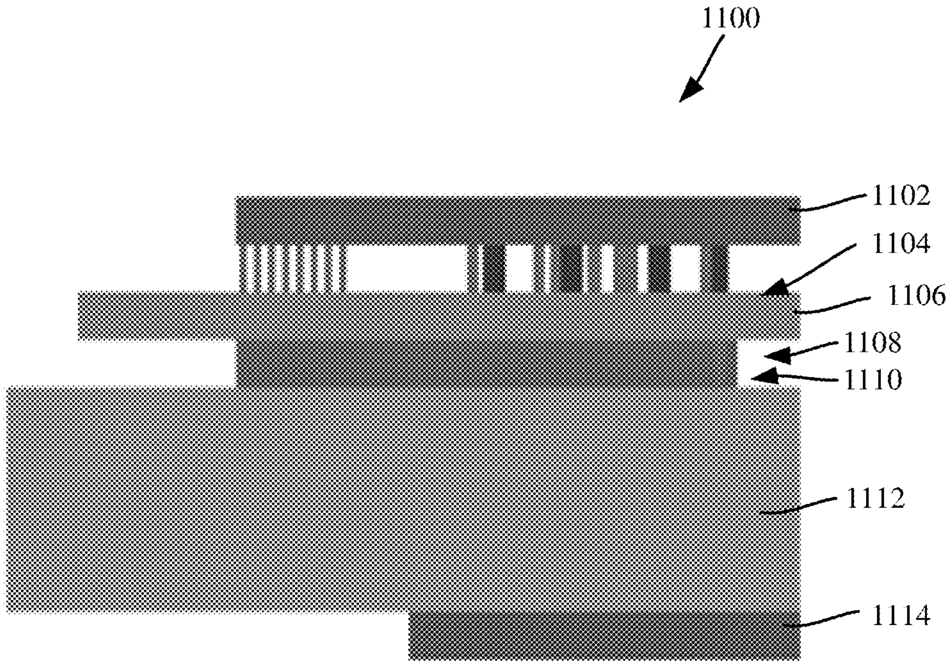
FIG. 12A shows a two-dimensional (2D) device cross-section view representation of the example switch device of FIG. 11, in accordance with various embodiments and implementations of the subject disclosure.

More particularly, as shown in FIGS. 11 and 12A, an example embodiment of the switch 1108 is constructed with a simplified material stack that includes three metallization layers and two dielectric layers, which enhances manufacturability and reduces complexity. More particularly, from the top downwards, a top metallization (e.g., Aluminum, Copper, or the like) layer 1102 is above phase change alloy 1104, which serve as junctions that can be individually switched from conductive to nonconductive states, and vice-versa. The phase change alloy 1104 can be deposited as the per-selectable port junctions on a thermally conductive dielectric layer 1106.

In general, the thermally conductive dielectric layer 1106 helps manage heat dissipation effectively, ensuring reliable operation across a wide range of thermal conditions. The multiport configuration supports flexible signal routing in complex communication systems, making it particularly suitable for applications such as reconfigurable RF front-ends, adaptive antenna systems, and secure communication networks.

Interconnects 1108 couple a refractory heater network 1110 comprising individual heating elements to voltage pulse (Vp) contacts in the top metallization layer 1102, whereby the conductive and nonconductive junction states can be controllably toggled on an individual basis. Other interconnects couple the RF signals to or from the ports.

The various layers and components are fabricated atop a substrate 1112, and an RF ground metallization layer 1114 is beneath the substrate 1112. Note that in alternative implementations, at least some alternative interconnects can be used to place at least some of the voltage pulse contacts and/or RF contacts beneath and through the RF ground metallization layer 1114.

Turning to the phase change junctions' individual phases, in one example implementation the respective ports can be switched in (coupled) or switched out (decoupled) based on the conductive or nonconductive states of the respective chalcogenide elements such as described in the examples herein. In general, with respect to heating phase change (chalcogenide) alloy material to change a junction's state from conductive (crystalline) state to nonconductive (amorphous) state and vice-versa, antimony telluride (SbTe) and germanium telluride (GeTe) are suitable phase change materials. GeSbTe can be tailored to offer more than six orders of magnitude change in material's resistivity with switching time on the order of sub-nanoseconds (ns), and thus provides more electrical contrast between the two states than SbTe, for example, (which offers up to four orders of magnitude change in material's resistance with switching time on the order of sub-picoseconds). GeSbTe also offers ultra-low resistance in crystalline state, offering better electromagnetic waves interaction and low resistive losses which are more prominent in SbTe.

Switching between the two states can be achieved by applying thermal energy such as a pulse with certain amplitude and width (duration on the order of nanoseconds (ns)) through an electrically insulated high-speed heater. Note that such phase change material holds its state as long as it is not actuated with another either crystalline or amorphous pulse, whereby the technology described herein offers energy-efficient switch reconfigurability, in that power is needed intermittently, that is, only during the reconfiguration phase when the heaters are actuated to change the state of the phase change material. Once the desired pattern is achieved, the material retains its state without the need for ongoing power.

Figure 12B:
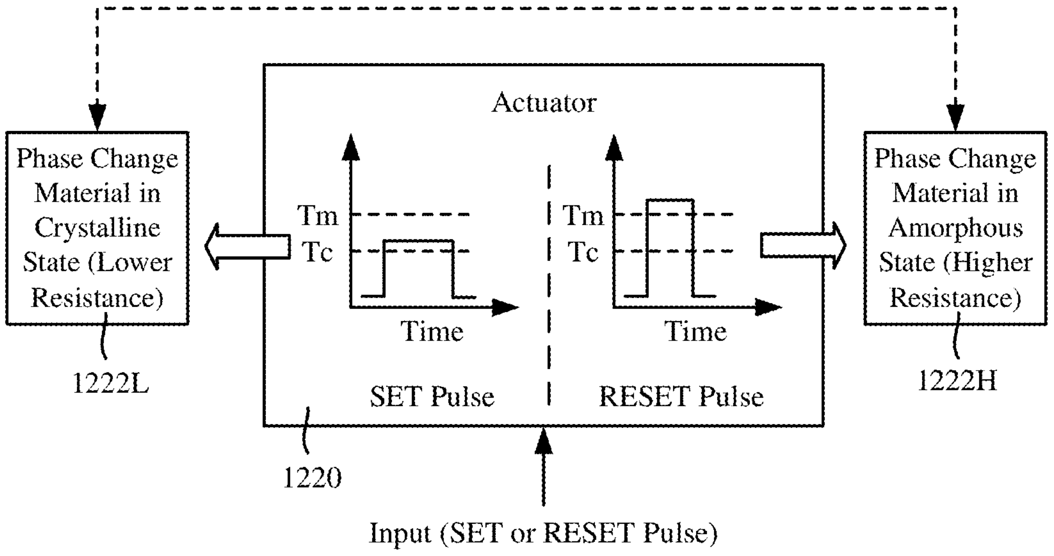
FIG. 12B shows an example of reversible switching of phase change material between an amorphous (high resistance) and crystalline (low resistance) states using a first electrical pulse for one state change and a second electrical pulse for a state change reversal, in accordance with various aspects and implementations of the subject disclosure.

As shown in FIG. 12B, a medium amplitude and relatively longer duration (typically on the order of nanoseconds) SET electrical pulse (e.g., represented in the left portion of the actuator) of an actuator (heating element) 1220 is used for crystallization during a transition to the ON state. Energy from the SET pulse heats the material for sufficient time to crystallize the material and provides adequate time for atoms to reorganize to an orderly arrangement, thus transforming from an amorphous state to crystalline state (block 1222L, or low). To change to the amorphous state, a short duration (typically less nanoseconds than for the SET pulse) and high amplitude RESET electrical pulse is used. The RESET pulse provides sufficient energy to melt the material to disorder the atoms followed by rapid quenching to freeze the atoms, thus transforming the material from the crystalline state to the amorphous state (block 1222H, or high). Significantly, only a short duration pulse to a heating element is needed to switch the state of the phase change material between states at the area/portion above the corresponding heating element; significantly, the pulse transforms the material and latches the material into the state, without the need for continuous power in either state. The pulse duration and amplitude can be further optimized by tuning the ratio of GeSbTe alloy ratios.

Figure 13A:
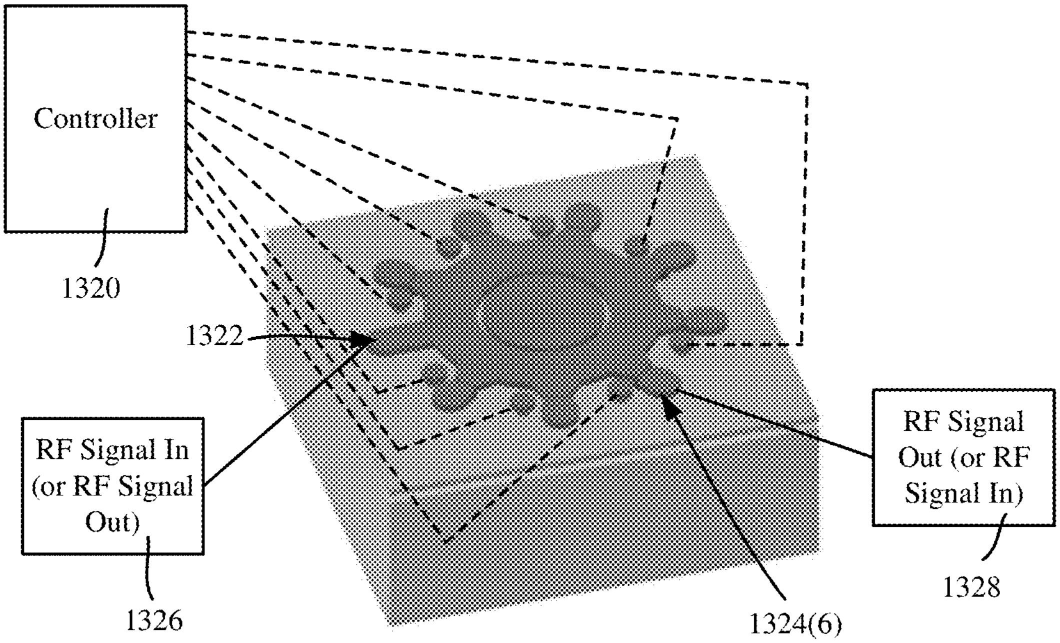
FIGS. 13A and 13B show how the example switch device can be controlled to selectively couple a common RF port to one or more selectable RF port(s), e.g., coupled to a Butler matrix, in accordance with various aspects and implementations of the subject disclosure.
Figure 13B:
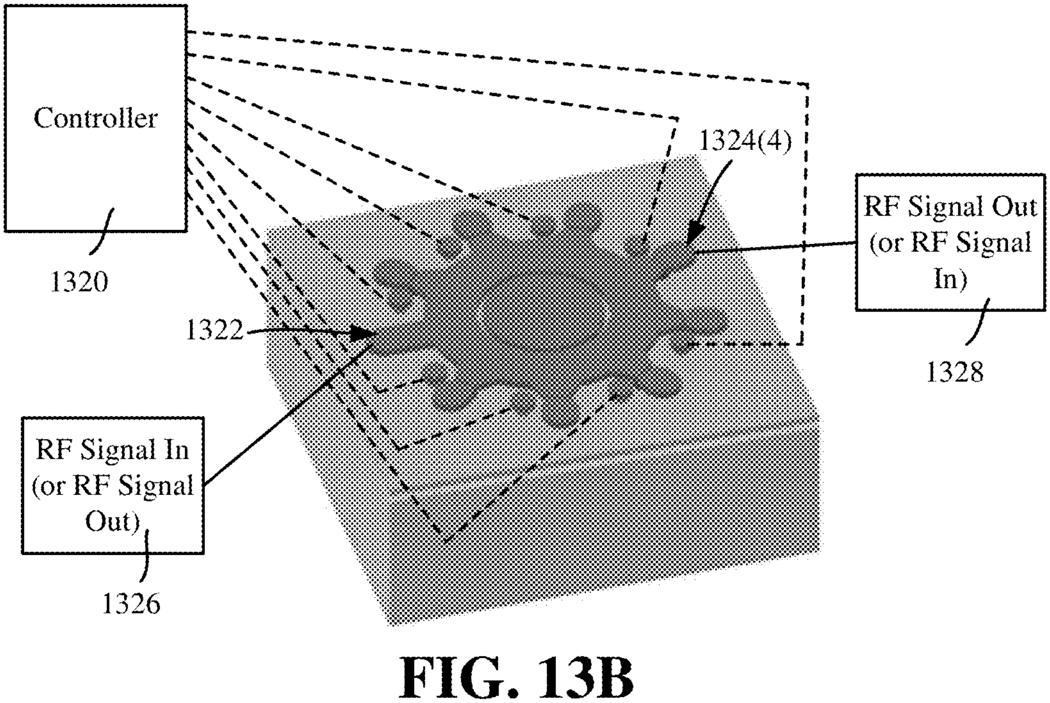

FIGS. 13A and 13B show how the example switch device 708 can be controlled by a controller 1320 to selectively couple a common RF port 1322 to a selectable RF port 1324(6), FIG. 3A, or to a different selectable RF port 1324(4), FIG. 3B. In FIG. 3A, the controller 1320 pulses the phase change material alloy of the ports such that the selectable port 1324(6) is conductively coupled to the common RF port 1322, while the other ports are decoupled from the common RF port 1322. This allows an RF signal 1326 (input at the common port 1322) to be obtained at the selectable port 1324(6) for RF signal output 1328, or vice-versa (signal input at the selectable port and output via the common port 1322). At some other time, FIG. 3B shows how the controller 1320 pulses the phase change material alloy of the ports such that the selectable port 1324(4) is conductively coupled to the common RF port 1322, while the other ports are decoupled from the common RF port 1322.

The operation principle of the example switch device 708 (FIG. 7) is thus based on the many orders of magnitude resistance change that chalcogenide phase change GST alloys undergo when provided a specific heat treatment using a pulse, as described with reference to FIG. 12B. Such materials can reversibly transition between a low resistance (metallic/conductive) state to a high resistance (insulator/resistive) state. This transition occurs due to the change in crystal structure of the alloy, which changes from amorphous to crystalline. In order to control the states of the material, the heater network 1110 (FIG. 7) has distributed heating elements placed below the phase change material (chalcogenide material) junctions. Hence, which port or ports are coupled to a common port can be achieved at a high speed, which provides ultrafast reconfigurable operation of the switch device.

Figure 14:
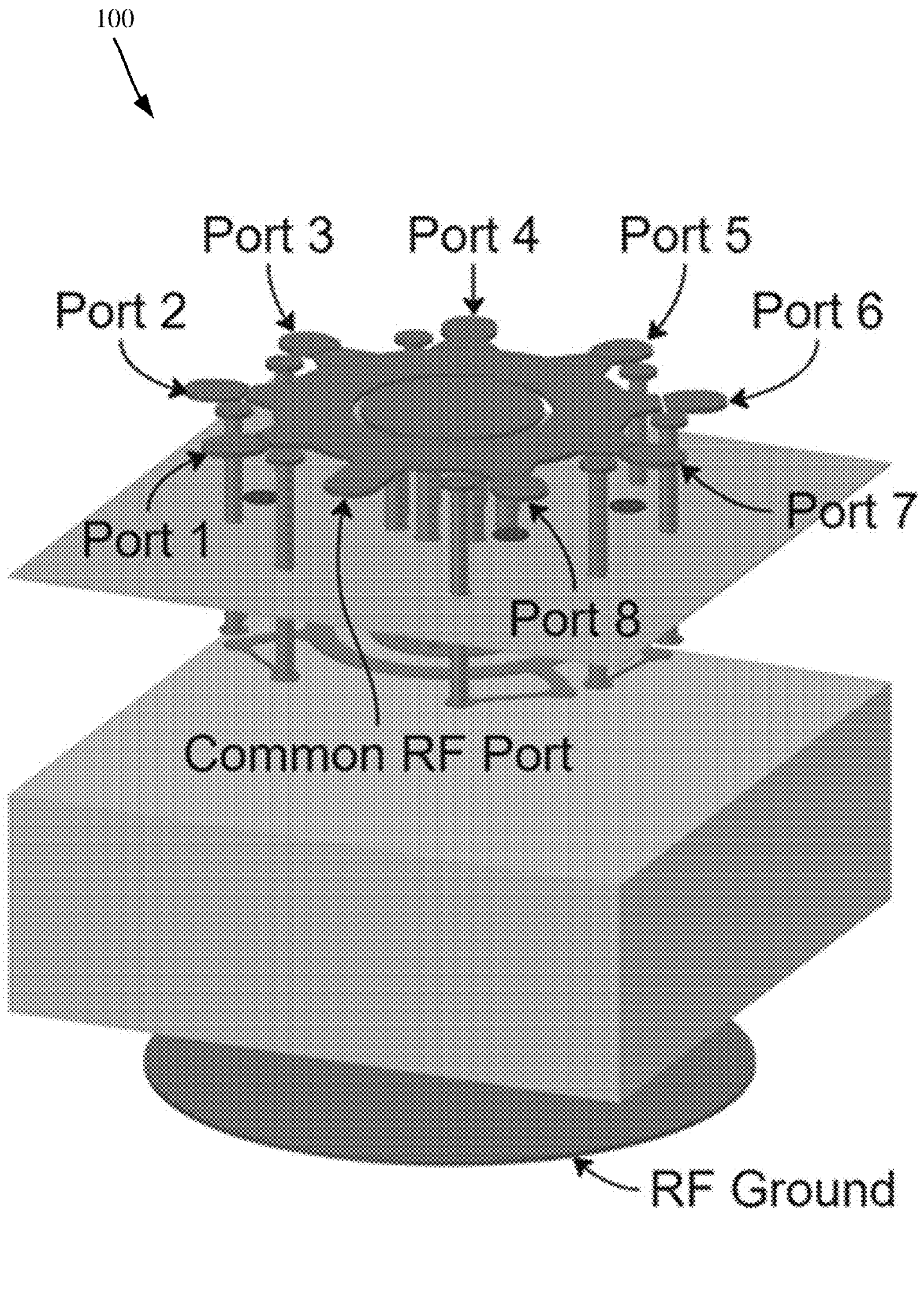
FIG. 14 is an exploded 3D view representation of an example switch device showing the port configuration, in which switching is achieved by using chalcogenide material junctions, in accordance with various embodiments and implementations of the subject disclosure.
Figure 15:
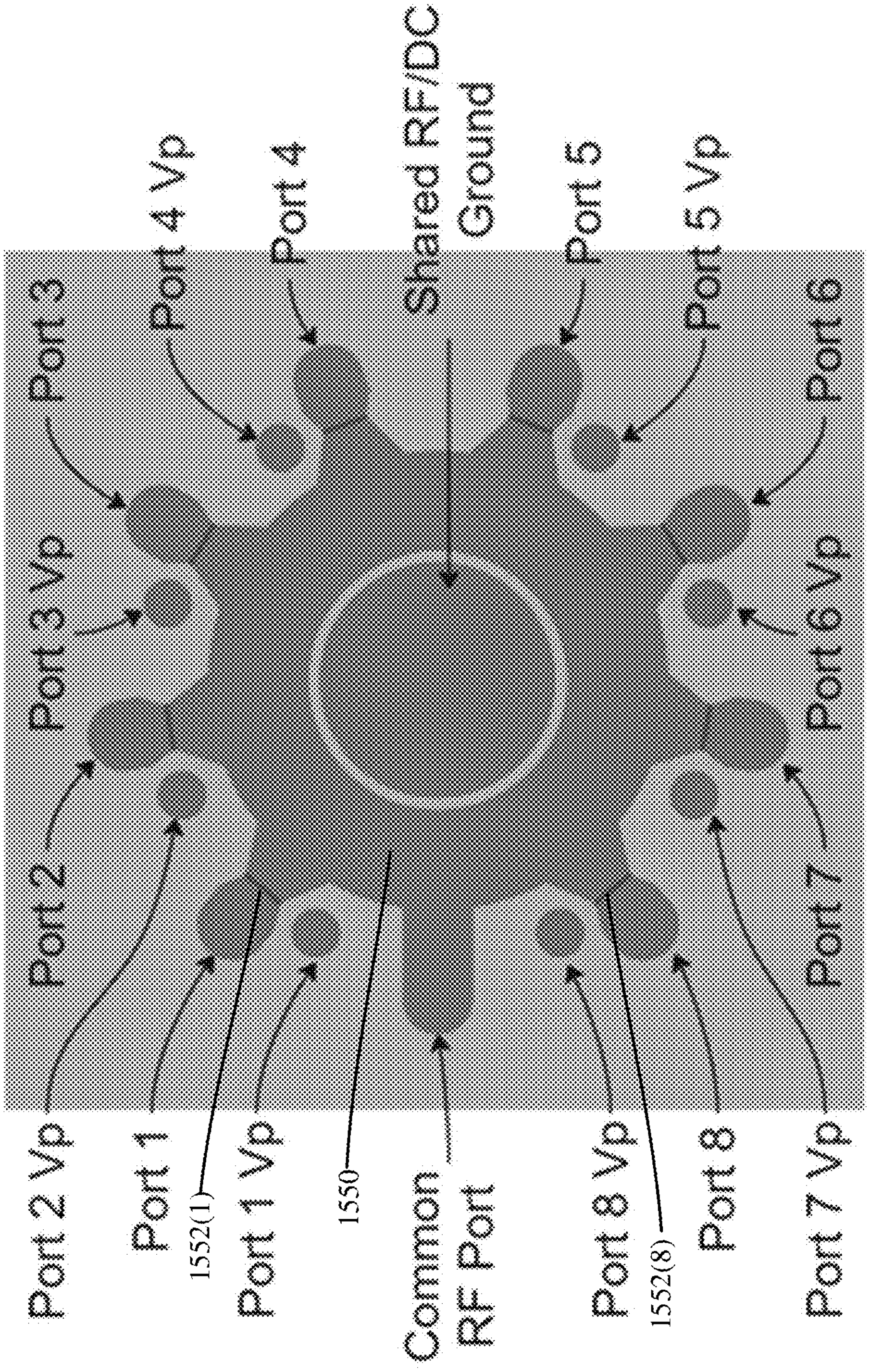
FIG. 15 is a top view representation of an example switch device showing the port configuration, in which switching is achieved by using chalcogenide material junctions, in accordance with various embodiments and implementations of the subject disclosure.

FIGS. 14 and 15 show the port configuration of an example eight port (plus one common RF port) switch device 708, which is thus a single-pole, eight-throw (SP8T) switch. Thus, there can be eight different RF signal inputs from selectable Port 1-Port 8 that goes to one output port common (the common RF port), or one common input (the common RF port) that can go to any of the eight selectable ports as output.

As shown in FIG. 15, a conductor 1550 is coupled to the common RF port. Whether a selectable port (Port 1-Port 8) is coupled to the conductor 1550 depends on the conductive or nonconductive state of its phase change alloy junction, shown as thin dark lines between the ports and the conductor 1550. Two such junctions, 1552(1) for Port 1, and 1552(8) for port 8, are labeled in FIG. 15; (the other junctions are not labeled for purposes of clarity).

In this example implementation, the design of the switch ports is purely symmetrical, whereby there is no significant performance difference between any ports, as they share the same circular ring. Note that other designs are feasible, and are not limited to symmetrical switch designs, nor to a single-pole, eight-throw switch; e.g., the technology described herein can be used for a SPnT switch, where n is any practical number.

As identified in FIG. 15, a middle disk serves as a shared RF/DC ground in the upper metallization layer. Also identified in FIG. 15 are the voltage pulse contacts, Port 1 Vp-Port 8 Vp, by which voltage pulses can be applied to change the respective conductive or nonconductive states of the respective junctions, thereby controllably coupling the common port to any controllably selected port. By selecting the appropriate switch junction coupling states, signals can be routed through the Butler matrix in various ways, corresponding to various beams.

Figure 16:
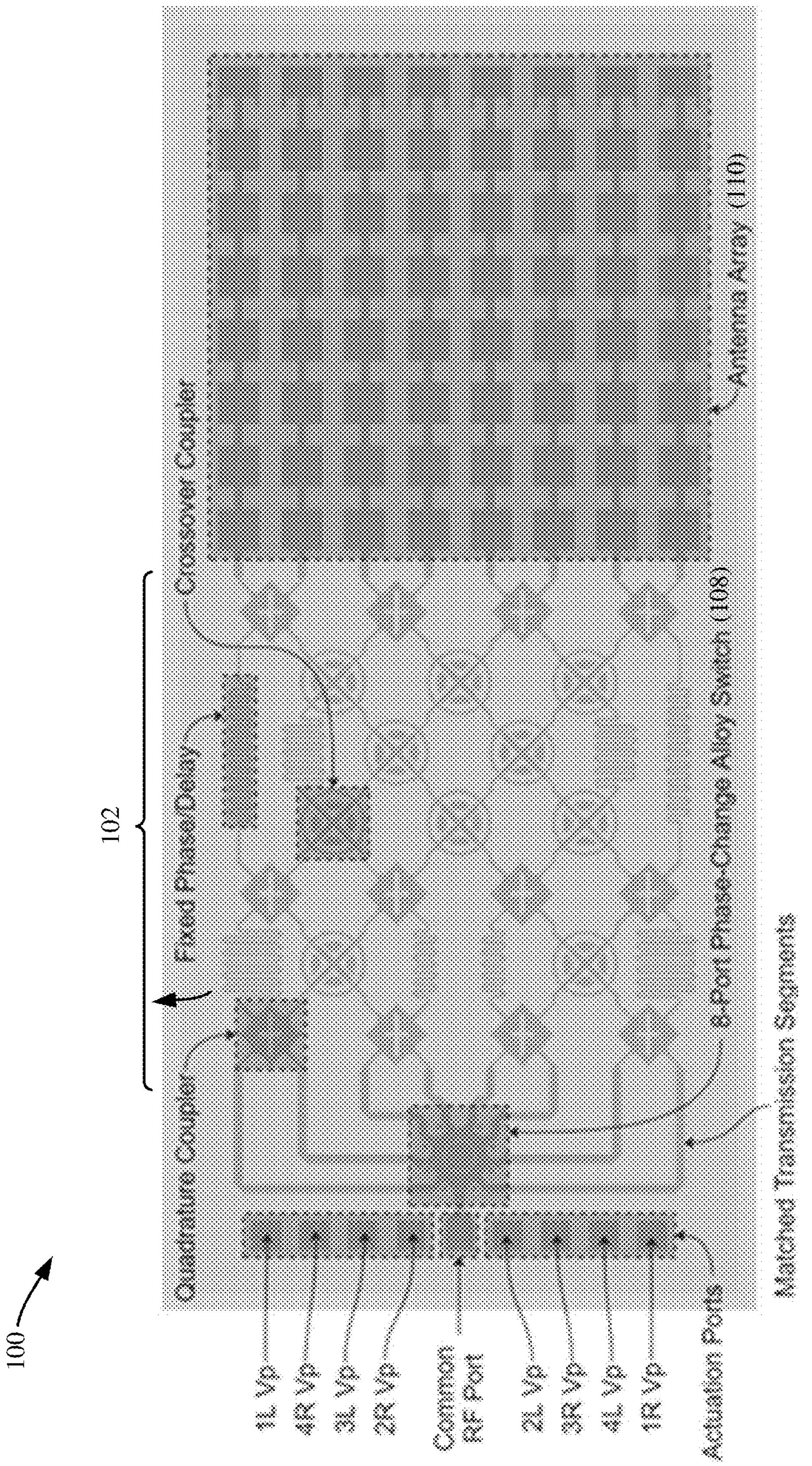
FIG. 16 is top view representation of an example system including an 8×8 Butler matrix showing various elements, a switch and an antenna array, in accordance with various embodiments and implementations of the subject disclosure.
Figure 17:
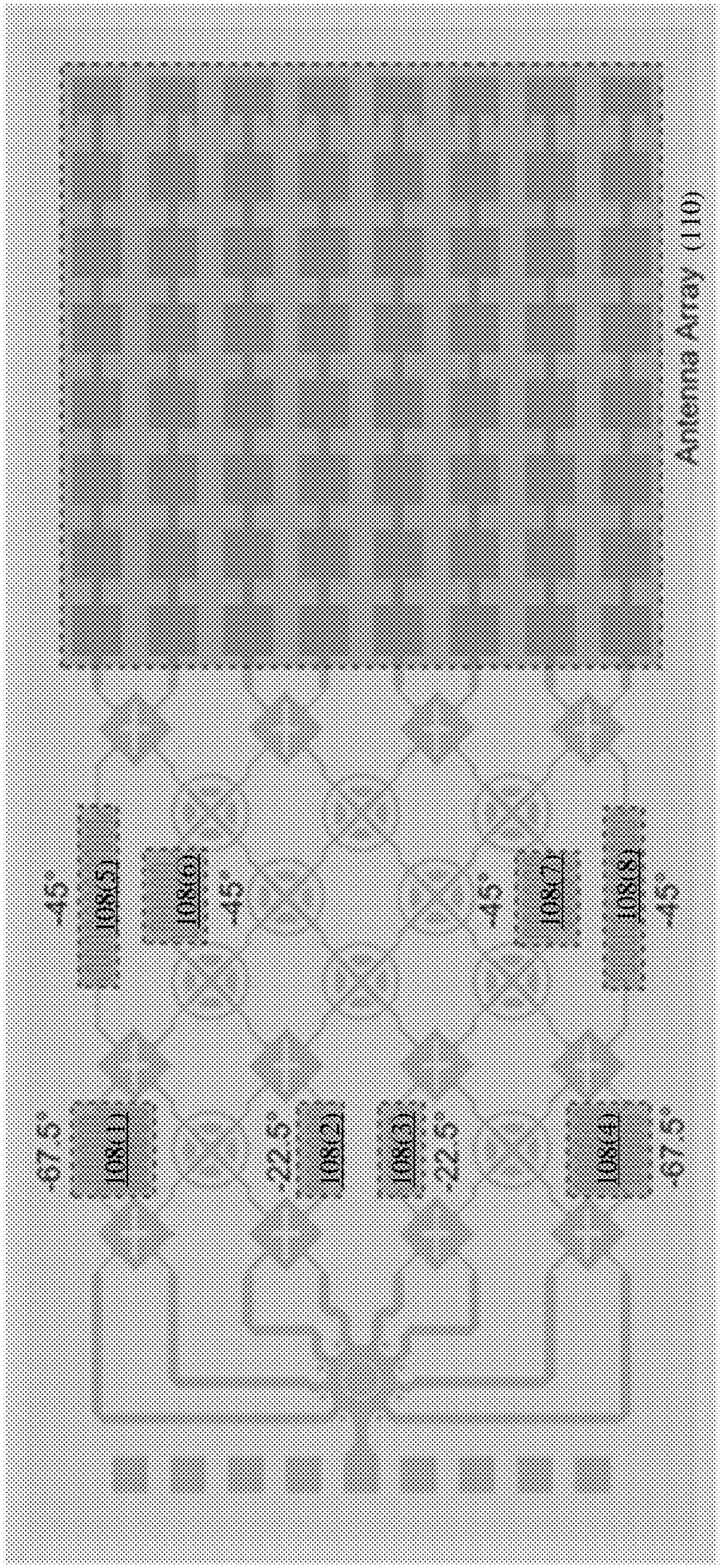
FIG. 17 is top view representation of an example system including an 8×8 Butler matrix showing various phase shifts for corresponding phase delay lines/elements, in accordance with various embodiments and implementations of the subject disclosure.

FIG. 16 shows the various ports (metal contacts) that can provide the RF signal to (or from) the common RF port, and the actuation ports for the switch configuration voltage pulses (Vp). FIG. 17 shows the phase delay lines with their resultant phase shifts in degrees.

Figure 18:
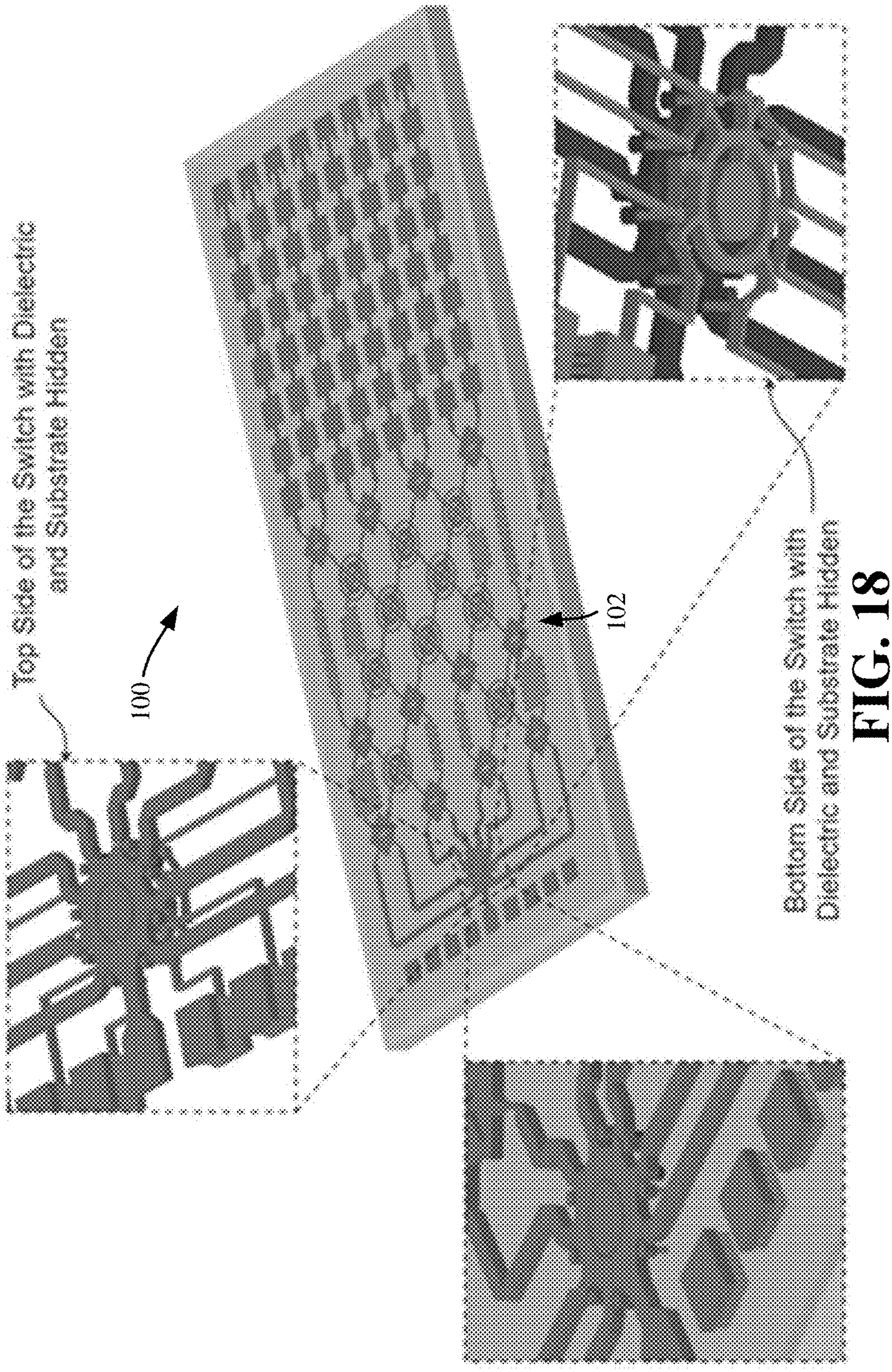
FIG. 18 is a 3D view representation of an example system including an 8×8 Butler matrix showing enlarged views of the switch device, in accordance with various embodiments and implementations of the subject disclosure.

FIG. 18 shows a 3D view of the system 100 including the Butler matrix 102. Enlarged views of the switch, including top and bottom views with the dielectric and substrate omitted for visualization are depicted in FIG. 18.

Figure 19:
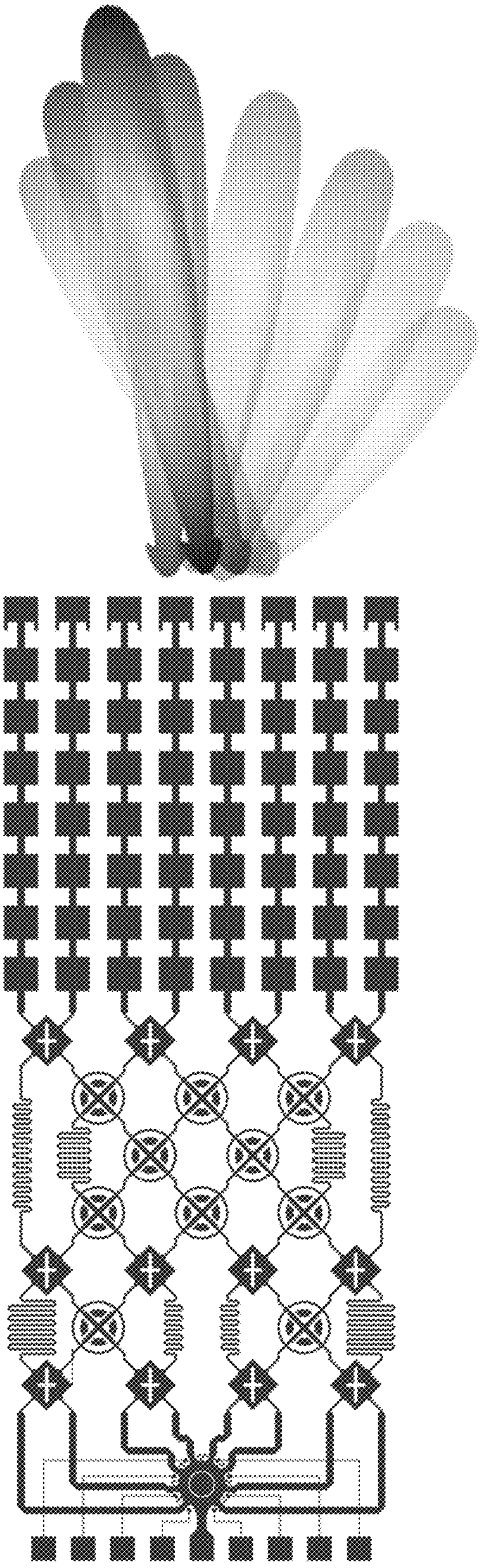
FIG. 19 is top view representation of an example system including an 8×8 Butler matrix showing a layout for fabrication with overlapping beamforming, in accordance with various embodiments and implementations of the subject disclosure.
Figure 20A:
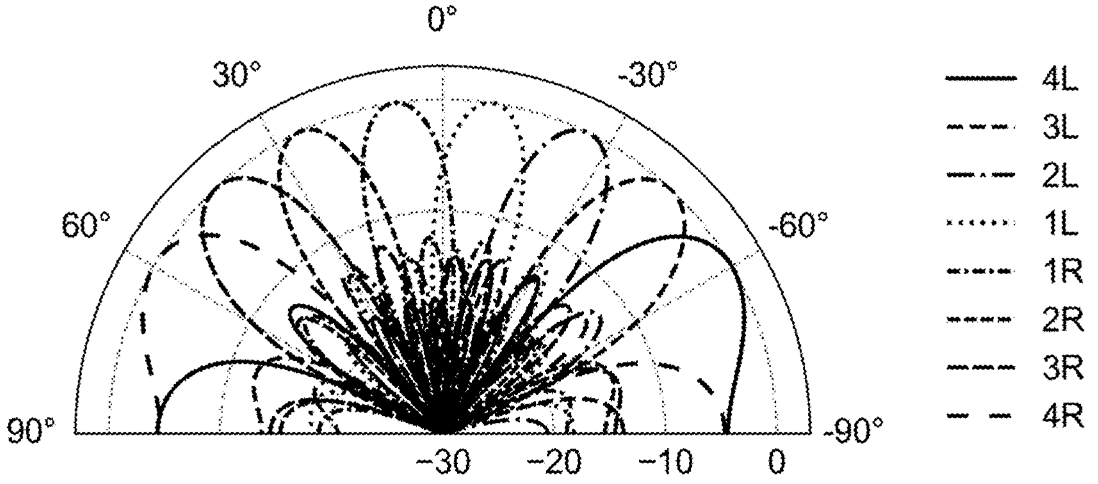
FIGS. 20A and 20B are graphical representations of example simulation results of a Butler matrix, in accordance with various embodiments and implementations of the subject disclosure.
Figure 20B:
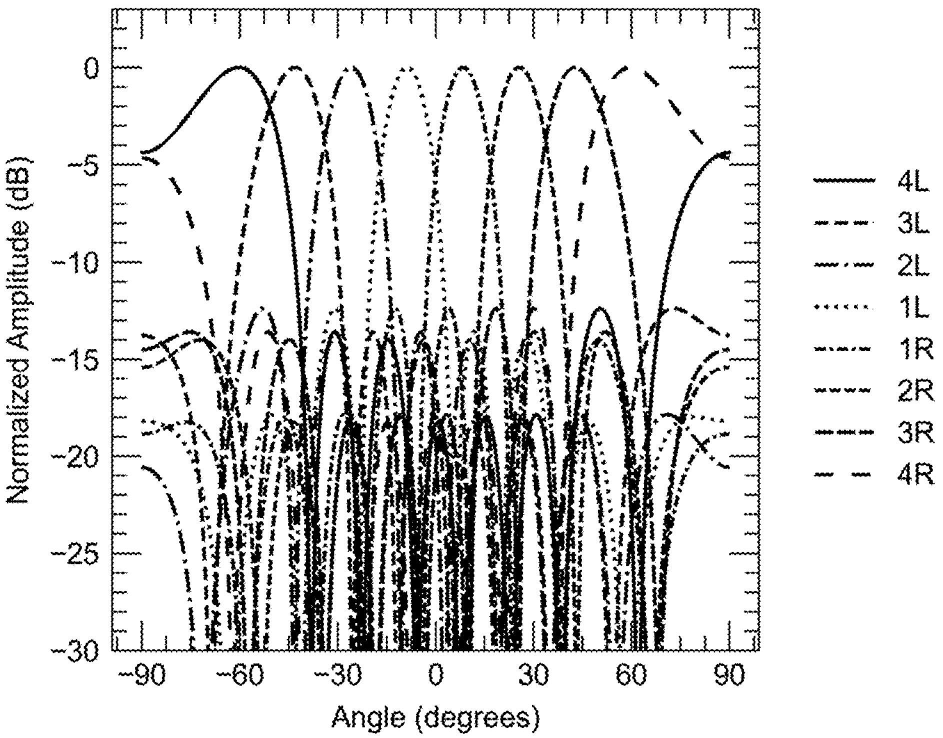
Figure 21A:
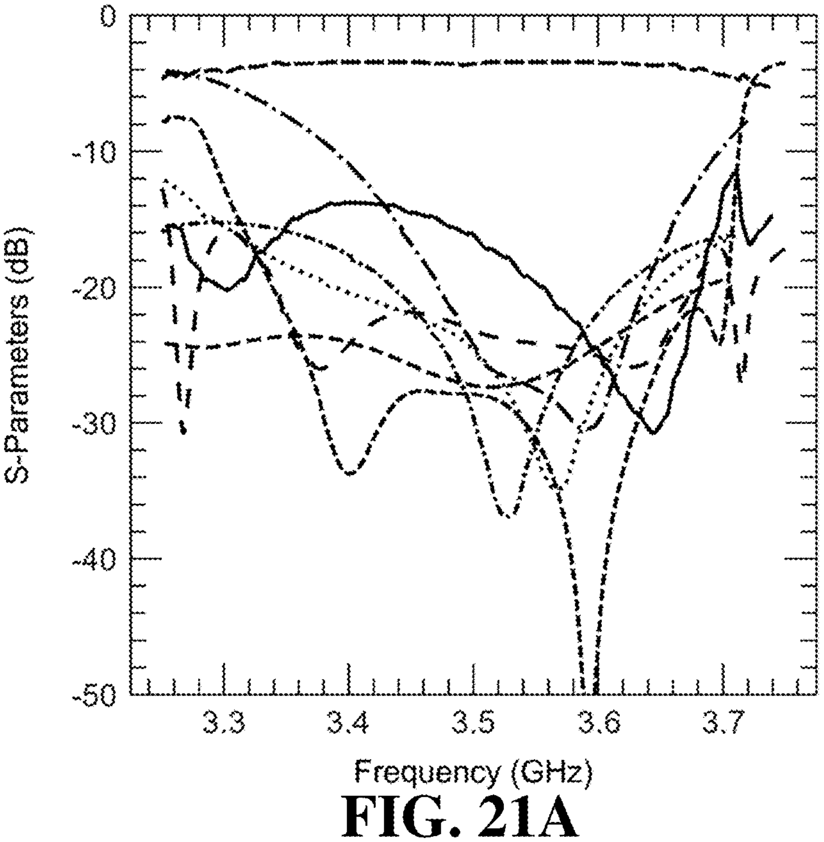
FIGS. 21A and 21B are graphical representations of beamforming performance results of an example simulation of a Butler matrix, in accordance with various embodiments and implementations of the subject disclosure.
Figure 21B:
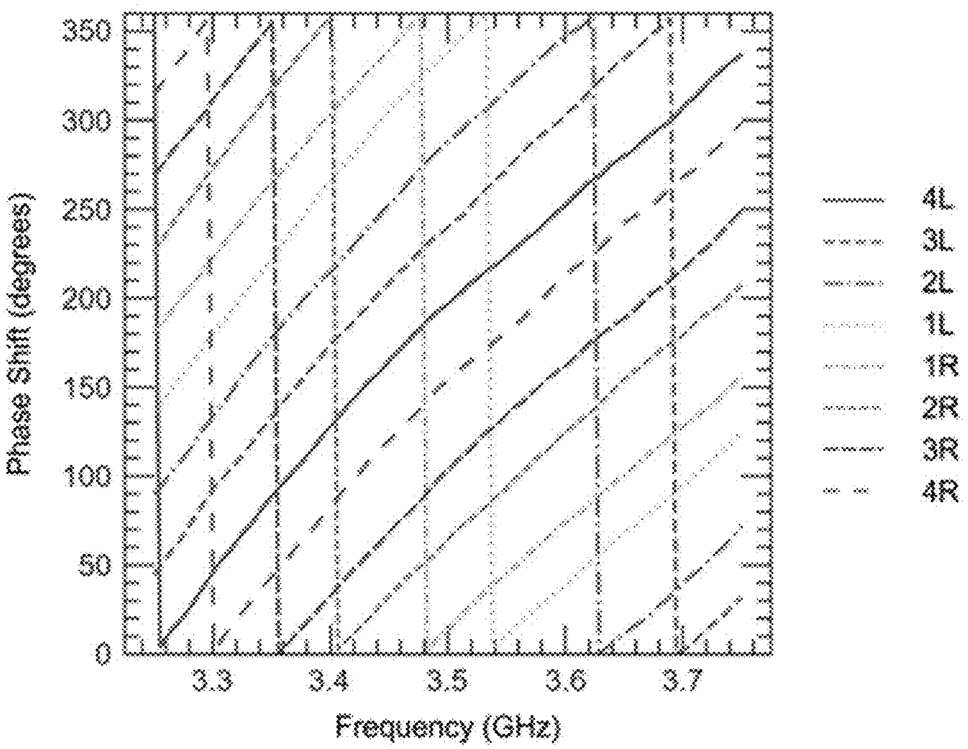

FIG. 19 shows the layout for fabrication with overlapping beamforming response (showing that the beamforming pattern works from −60° to 60°) with simulation performance results (FIGS. 20A and 20B) based on switch/port selection. FIGS. 21A and 21B show simulation results of the Butler Matrix, namely the S-Parameters Response (FIG. 21A) and the phase shift results (FIG. 21B).

One or more example embodiments can be embodied in a device including a common RF port and respective selectable RF ports above a substrate, an antenna array, and a Butler matrix that couples the common RF port to antenna elements of the antenna array. The Butler matrix can be in a metal layer above the substrate with a metal ground plane beneath the substrate. The Butler matrix can include delay elements, quadrature couplers, and crossover couplers. The multiport switch can be controllable to route an RF signal, obtained via the common RF port to one or more of the respective selectable RF ports, through the Bulter matrix to the antenna array, to transmit the RF signal via a beamformed beam from the antenna array.

The RF signal can be a first RF signal, the beamformed beam can be a first beamformed beam, and the multiport switch can be controllable to route a second RF signal, received at the antenna array via a second beamformed beam, through the Bulter matrix to the common RF port.

The antenna array can be fabricated in the metal layer.

The multiport switch can include respective phase change material junctions coupled to the respective selectable ports, and a controllable heater network including respective heating elements that transfer heat to the respective phase change material junctions, the controllable heater network being controlled to output heat via energy pulses to selectively change a first set of one or more of the respective phase change material junctions to a lower resistance state that electrically couples the common RF port to a first group of the respective selectable ports, and to selectively change a second set of the one or more of the respective phase change material junctions to a higher resistance state that electrically decouples the common RF port from a second group of the respective selectable ports.

Each quadrature coupler of the quadrature coupler can include a top metallization layer corresponding to the metal layer above the substrate. The top metallization layer can include a metallic upper plane, a first port coupled to the metallic upper plane via a first microstrip line, a second port coupled to the metallic upper plane via a second microstrip line, a third port coupled to the metallic upper plane via a third microstrip line, and a fourth port coupled to the metallic upper plane via a fourth microstrip line; the first port can be opposite the third port, the first port can be adjacent to the second port, and the first port can be the adjacent to fourth port. The top metallization layer can include a first slot in the metallic upper plane having a first slot width and a first slot length, and a second slot in the metallic upper plane having a second slot width and a second slot length; the first slot can cross the second slot at an intersection point.

The first slot can be angled at substantially about forty-five degrees relative to the first microstrip line and the third microstrip line, the second slot can be substantially perpendicular to the first slot; the first slot can be length can be greater than the second slot length, and the intersection point of the first slot and the second slot can be substantially centered relative to the metallic upper plane.

Each crossover coupler of the crossover couplers can include a top metallization layer corresponding to the metal layer above the substrate. The top metallization layer can include a first port, a second port, a third port, and a fourth port; the first port can be coupled to a first segment of a first microstrip line and the third port can be coupled to a third segment of the first microstrip line, and the second port can be coupled to a second segment of a second microstrip line and the fourth port can be coupled to a fourth segment of the second microstrip line. The first microstrip line and the second microstrip line can cross at an intersection point in a cross-shaped pattern. Inner partial couplers can surround the intersection point, including a first inner partial coupler between the first segment and the fourth segment, a second inner partial coupler between the first segment and the second segment, a third inner partial coupler between the second segment and the third segment, and a fourth inner partial coupler between the third segment and the fourth segment. An outer ring can surround the inner partial couplers.

The metal ground plane can include a bottom metallization layer, associated with each crossover coupler, including a defined-size cutout area, and in which the defined-size cutout area can be determined by a height of the substrate.

The Butler matrix can include an 8×8 Butler matrix.

The non-volatile RF multiport switch can include eight respective selectable RF ports.

Figure 22:
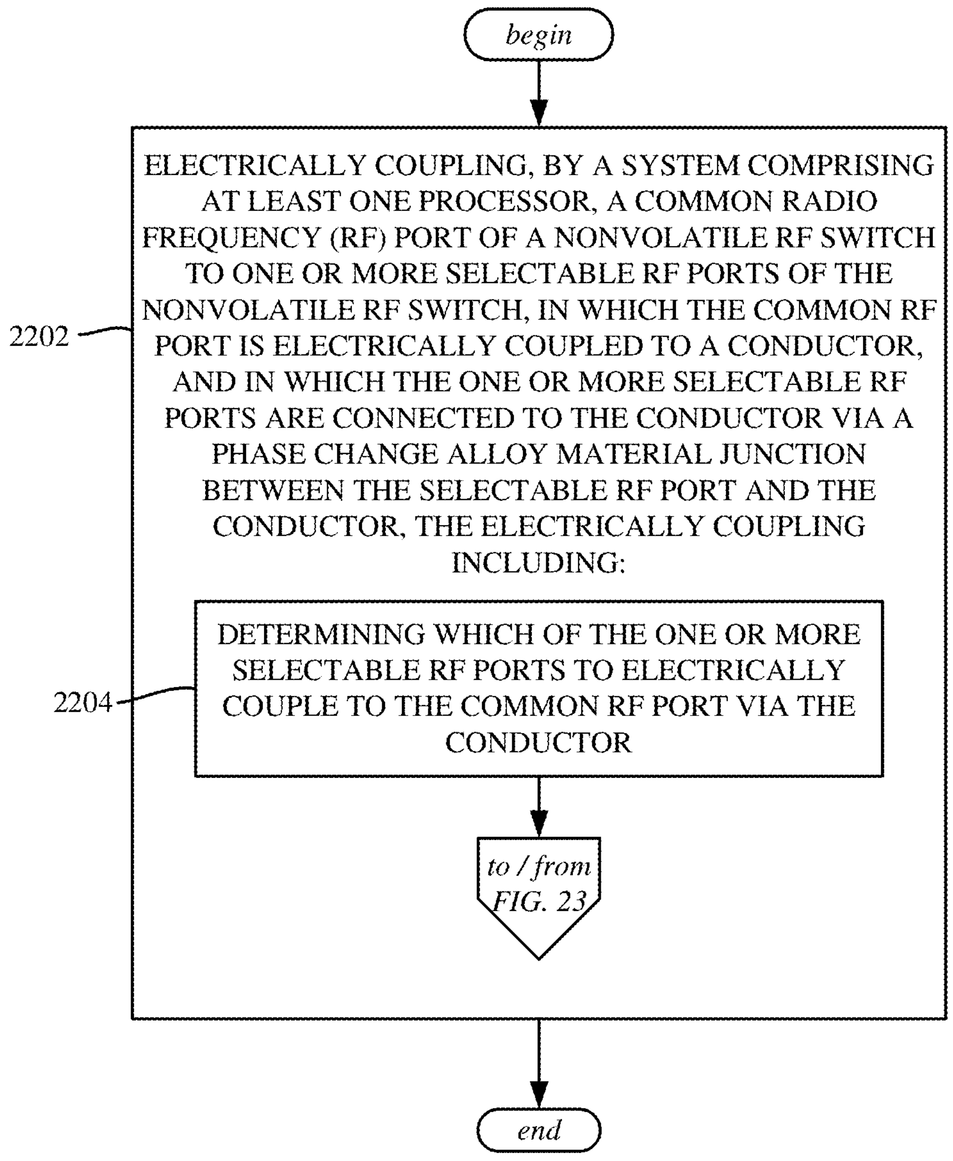
FIGS. 22 and 23 comprise a flow diagram showing example operations related to controlling a phase change alloy-based switch to electrically couple signals to selected Butler matrix ports, in accordance with various example embodiments and implementations of the subject disclosure.
Figure 23:
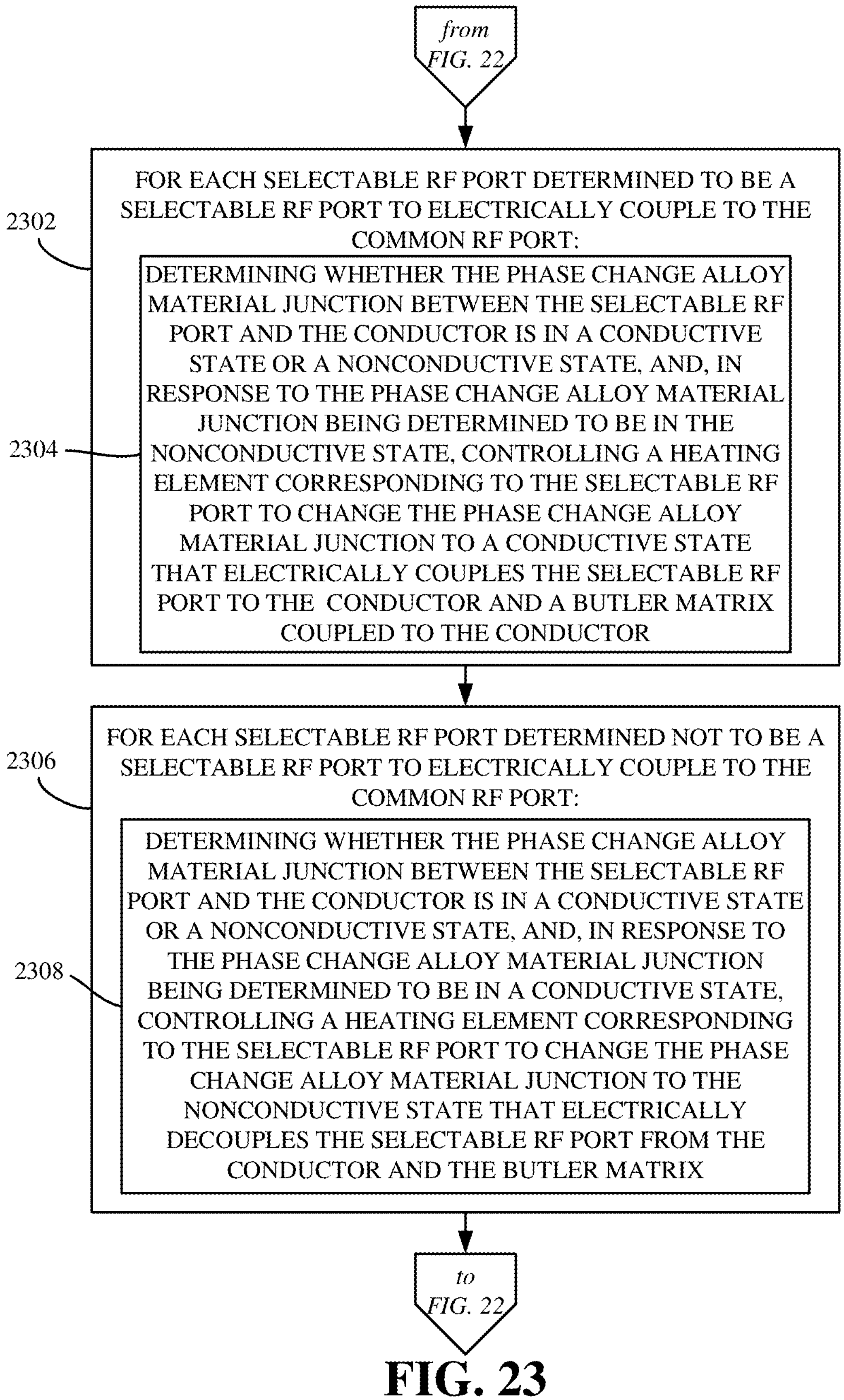

FIGS. 22 and 23 summarize various example operations, e.g., corresponding to a method, a computer-implemented system, and/or a machine-readable medium, including executable instructions that, when executed by a processor, that, when executed by at least one processor, facilitate performance of operations. Example operation 2202 of FIG. 22 represents electrically coupling, by a system including at least one processor, a common radio frequency (RF) port of a nonvolatile RF switch to one or more selectable RF ports of the nonvolatile RF switch, in which the common RF port can be electrically coupled to a conductor; the one or more selectable RF ports can be connected to the conductor via a phase change alloy material junction between the selectable RF port and the conductor, the electrically coupling including example operation 2204. Example operation 2204 represents determining which of the one or more selectable RF ports to electrically couple to the common RF port via the conductor. The operations continue at example operation 2302 of FIG. 23, which represents, for each selectable RF port determined to be a selectable RF port to electrically couple to the common RF port, determining (example operation 2304) whether the phase change alloy material junction between the selectable RF port and the conductor can be in a conductive state or a nonconductive state, and, in response to the phase change alloy material junction being determined to be in the nonconductive state, controlling a heating element corresponding to the selectable RF port to change the phase change alloy material junction to a conductive state that electrically couples the selectable RF port to the conductor and a Butler matrix coupled to the conductor. Example operation 2306 represents, for each selectable RF port determined not to be a selectable RF port to electrically couple to the common RF port, determining (example operation 2308) whether the phase change alloy material junction between the selectable RF port and the conductor can be in a conductive state or a nonconductive state, and, in response to the phase change alloy material junction being determined to be in a conductive state, controlling a heating element corresponding to the selectable RF port to change the phase change alloy material junction to the nonconductive state that electrically decouples the selectable RF port from the conductor and the Butler matrix.

The common RF port can be an input port that obtains an RF signal as input, and the electrically coupling can include determining at least one of one the one or more selectable RF ports as at least one corresponding output port for coupling the RF signal to an antenna array coupled to the Butler matrix.

Further operations can include obtaining, by the system, beamforming information corresponding to beamforming a beam corresponding to the RF signal from the antenna array, and in which the determining of which of the one or more selectable RF ports to electrically couple to the common RF port via the conductor can be based on the beamforming information.

The common RF port can be an output port, and in the electrically coupling can include determining at least one of one the one or more selectable RF ports as at least one corresponding input port for coupling an RF signal obtained at the Butler matrix via an antenna array coupled thereto.

Controlling the heating element can include pulsing the heating element with a first voltage or current pulse to change the phase change alloy material junction to the conductive state, or pulsing the heating element with a second voltage or current pulse to change the phase change alloy material junction to the nonconductive state.

One or more example embodiments can be embodied in a device, such as described and represented herein. The device can include a Butler matrix including a top metallization layer corresponding to a metal layer above a substrate, and metal ground plane beneath the substrate. The Butler matrix can include quadrature couplers, crossover couplers and delay elements integrated into the top metallization layer. Each quadrature coupler of the quadrature coupler can include a metallic upper plane in the top metallization layer, a first port coupled to the metallic upper plane via a first microstrip line, a second port coupled to the metallic upper plane via a second microstrip line, a third port coupled to the metallic upper plane via a third microstrip line, and a fourth port coupled to the metallic upper plane via a fourth microstrip line, in which the first port can be opposite the third port, the first port can be adjacent to the second port, and the first port can be the adjacent to fourth port, a first slot in the metallic upper plane having a first slot width and a first slot length, and a second slot in the metallic upper plane having a second slot width and a second slot length, in which the first slot crosses the second slot at an intersection point. Each crossover coupler of the crossover couplers can include a fifth port, a sixth port, a seventh port, and an eighth port; the fifth port can be coupled to a first segment of a fifth microstrip line and the seventh port can be coupled to a third segment of the fifth microstrip line, and in which the sixth port can be coupled to a second segment of a sixth microstrip line and the fourth port can be coupled to a fourth segment of the sixth microstrip line, the fifth microstrip line and the sixth microstrip line cross at an intersection point in a cross-shaped pattern; inner partial couplers can surround the intersection point, including a first inner partial coupler between the first segment and the fourth segment, a second inner partial coupler between the first segment and the second segment, a third inner partial coupler between the second segment and the third segment, and a fourth inner partial coupler between the third segment and the fourth segment, and an outer ring can surround the inner partial couplers.

The device further can include a radio frequency (RF) switch, which can include a common RF port and respective selectable RF ports, respective phase change material junctions coupled to the respective selectable ports, and a controllable heater network including respective heating elements that transfer heat to the respective phase change material junctions, the controllable heater network being controlled to output heat via energy pulses to selectively change a first set of one or more of the respective phase change material junctions to a lower resistance state that electrically couples the common RF port to a first group of the respective selectable ports, and to selectively change a second set of the one or more of the respective phase change material junctions to a lower resistance state that electrically decouples the common RF port from a second group of the respective selectable ports.

The common RF port and respective selectable RF ports can be integrated into the top metallization layer.

The device further can include a thermally conductive dielectric layer between the respective phase change material junctions and the respective heating elements.

For each quadrature coupler, the first slot can be angled at substantially about forty-five degrees relative to the first microstrip line and the third microstrip line, the second slot can be substantially perpendicular to the first slot, the first slot length can be greater than the second slot length, and the intersection point of the first slot and the second slot can be substantially centered relative to the metallic upper plane. Each crossover coupler can be associated with a portion of the metal ground plane, and the portion can include a defined-size cutout area.

As can be seen, the technology described herein is directed to a Butler matrix that can be fabricated with a phase change alloy-based multiport switch and an antenna array in a system, which can be realized in a single planar structure. This facilitates a low-cost design for scalable manufacturing in which an entire passive beamforming network can be integrated on a single planar layer, which further facilitates integration with existing systems and reduces manufacturing costs.

As some nonlimiting example use cases, the Butler matrix described herein enables 5G radios to dynamically steer beams, e.g., within the C-band, optimizing coverage and signal strength for users in dense urban environments, where line-of-sight conditions frequently change. By precisely directing beams and avoiding interference with neighboring cells operating in the same or adjacent frequencies, the Butler matrix improves overall network performance and spectral efficiency. In suburban or rural areas, the Butler matrix allows 5G radios to adaptively steer beams towards fixed locations, such as homes or businesses, ensuring stable and high-speed connections for fixed wireless access services.

In MIMO systems, the Butler matrix improves spatial multiplexing by precisely controlling beam directions, leading to better signal separation and increased data throughput. For 5G radios in, the Butler matrix supports seamless beam handovers for users in high-mobility scenarios, such as vehicles, ensuring consistent connectivity and minimal signal degradation. The Butler matrix enhances network capacity in stadiums and large venues by dynamically steering multiple beams in the, efficiently managing the high-density user environment and providing reliable, high-speed connectivity to thousands of simultaneous users.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms “component,” “system,” “platform,” “layer,” “selector,” “interface,” and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a non-volatile radio frequency (RF) multiport switch comprising a common RF port and respective selectable RF ports above a substrate;

an antenna array; and a Butler matrix that couples the common RF port to antenna elements of the antenna array, the Butler matrix being comprised in a metal layer above the substrate with a metal ground plane beneath the substrate, the Butler matrix comprising:

delay elements, quadrature couplers, and crossover couplers, wherein the multiport switch is controllable to route an RF signal, obtained via the common RF port to one or more of the respective selectable RF ports, through the Butler matrix to the antenna array, to transmit the RF signal via a beamformed beam from the antenna array, and wherein the multiport switch comprises:

respective phase change material junctions coupled to the respective selectable ports, and a controllable heater network comprising respective heating elements that transfer heat to the respective phase change material junctions, the controllable heater network being controlled to output heat via energy pulses to selectively change a first set of one or more of the respective phase change material junctions to a lower resistance state that electrically couples the common RF port to a first group of the respective selectable ports, and to selectively change a second set of the one or more of the respective phase change material junctions to a higher resistance state that electrically decouples the common RF port from a second group of the respective selectable ports.

2. The system of claim 1, wherein the RF signal is a first RF signal, wherein the beamformed beam is a first beamformed beam, and wherein the multiport switch is controllable to route a second RF signal, received at the antenna array via a second beamformed beam, through the Butler matrix to the common RF port.

3. The system of claim 1, wherein the antenna array is fabricated in the metal layer.

4. The system of claim 1, wherein each quadrature coupler of the quadrature coupler comprises:

a top metallization layer corresponding to the metal layer above the substrate, the top metallization layer comprising:

a metallic upper plane, a first port coupled to the metallic upper plane via a first microstrip line, a second port coupled to the metallic upper plane via a second microstrip line, a third port coupled to the metallic upper plane via a third microstrip line, and a fourth port coupled to the metallic upper plane via a fourth microstrip line, wherein the first port is opposite the third port, the first port is adjacent to the second port, and the first port is the adjacent to fourth port, a first slot in the metallic upper plane having a first slot width and a first slot length, and a second slot in the metallic upper plane having a second slot width and a second slot length, wherein the first slot crosses the second slot at an intersection point.

5. The system of claim 4, wherein the first slot is angled at substantially about forty-five degrees relative to the first microstrip line and the third microstrip line, wherein the second slot is substantially perpendicular to the first slot, wherein the first slot is length is greater than the second slot length, and wherein the intersection point of the first slot and the second slot is substantially centered relative to the metallic upper plane.

6. The system of claim 1, wherein each crossover coupler of the crossover couplers comprises:

a top metallization layer corresponding to the metal layer above the substrate, the top metallization layer comprising:

a first port, a second port, a third port, and a fourth port, wherein the first port is coupled to a first segment of a first microstrip line and the third port is coupled to a third segment of the first microstrip line, and wherein the second port is coupled to a second segment of a second microstrip line and the fourth port is coupled to a fourth segment of the second microstrip line, and wherein the first microstrip line and the second microstrip line cross at an intersection point in a cross-shaped pattern, inner partial couplers surrounding the intersection point, comprising a first inner partial coupler between the first segment and the fourth segment, a second inner partial coupler between the first segment and the second segment, a third inner partial coupler between the second segment and the third segment, and a fourth inner partial coupler between the third segment and the fourth segment, and an outer ring surrounding the inner partial couplers.

7. The system of claim 6, wherein the metal ground plane comprises a bottom metallization layer, associated with each crossover coupler, comprising a defined-size cutout area, and wherein the defined-size cutout area is determined by a height of the substrate.

8. The system of claim 1, wherein the Butler matrix comprises an 8×8 Butler matrix.

9. The system of claim 1, wherein the non-volatile RF multiport switch comprises eight respective selectable RF ports.

10. A method, comprising:

electrically coupling, by a system comprising at least one processor, a common radio frequency (RF) port of a nonvolatile RF switch to one or more selectable RF ports of the nonvolatile RF switch, wherein the common RF port is electrically coupled to a conductor, and wherein the one or more selectable RF ports are connected to the conductor via a phase change alloy material junction between the selectable RF port and the conductor, the electrically coupling comprising:

determining which of the one or more selectable RF ports to electrically couple to the common RF port via the conductor;

for each selectable RF port determined to be a selectable RF port to electrically couple to the common RF port, determining whether the phase change alloy material junction between the selectable RF port and the conductor is in a conductive state or a nonconductive state, and, in response to the phase change alloy material junction being determined to be in the nonconductive state, controlling a heating element corresponding to the selectable RF port to change the phase change alloy material junction to a conductive state that electrically couples the selectable RF port to the conductor and a Butler matrix coupled to the conductor; and for each selectable RF port determined not to be a selectable RF port to electrically couple to the common RF port, determining whether the phase change alloy material junction between the selectable RF port and the conductor is in a conductive state or a nonconductive state, and, in response to the phase change alloy material junction being determined to be in a conductive state, controlling a heating element corresponding to the selectable RF port to change the phase change alloy material junction to the nonconductive state that electrically decouples the selectable RF port from the conductor and the Butler matrix.

11. The method of claim 10, wherein the common RF port is an input port that obtains an RF signal as input, and wherein the electrically coupling comprises determining at least one of one the one or more selectable RF ports as at least one corresponding output port for coupling the RF signal to an antenna array coupled to the Butler matrix.

12. The method of claim 11, further comprising:

obtaining, by the system, beamforming information corresponding to beamforming a beam corresponding to the RF signal from the antenna array, and wherein the determining of which of the one or more selectable RF ports to electrically couple to the common RF port via the conductor is based on the beamforming information.

13. The method of claim 10, wherein the common RF port is an output port, and wherein the electrically coupling comprises determining at least one of one the one or more selectable RF ports as at least one corresponding input port for coupling an RF signal obtained at the Butler matrix via an antenna array coupled thereto.

14. The method of claim 10, wherein the controlling of the heating element comprises pulsing the heating element with a first voltage or current pulse to change the phase change alloy material junction to the conductive state, or pulsing the heating element with a second voltage or current pulse to change the phase change alloy material junction to the nonconductive state.

15. A device, comprising:

a Butler matrix comprising a top metallization layer corresponding to a metal layer above a substrate, and metal ground plane beneath the substrate, the Butler matrix comprising quadrature couplers, crossover couplers and delay elements integrated into the top metallization layer, wherein each quadrature coupler of the quadrature coupler comprises:

a metallic upper plane in the top metallization layer, a first port coupled to the metallic upper plane via a first microstrip line, a second port coupled to the metallic upper plane via a second microstrip line, a third port coupled to the metallic upper plane via a third microstrip line, and a fourth port coupled to the metallic upper plane via a fourth microstrip line, wherein the first port is opposite the third port, the first port is adjacent to the second port, and the first port is the adjacent to fourth port, a first slot in the metallic upper plane having a first slot width and a first slot length, and a second slot in the metallic upper plane having a second slot width and a second slot length, wherein the first slot crosses the second slot at an intersection point, and wherein each crossover coupler of the crossover couplers comprises:

a fifth port, a sixth port, a seventh port, and an eighth port, wherein the fifth port is coupled to a first segment of a fifth microstrip line and the seventh port is coupled to a third segment of the fifth microstrip line, and wherein the sixth port is coupled to a second segment of a sixth microstrip line and the fourth port is coupled to a fourth segment of the sixth microstrip line, and wherein the fifth microstrip line and the sixth microstrip line cross at an intersection point in a cross-shaped pattern, inner partial couplers surrounding the intersection point, comprising a first inner partial coupler between the first segment and the fourth segment, a second inner partial coupler between the first segment and the second segment, a third inner partial coupler between the second segment and the third segment, and a fourth inner partial coupler between the third segment and the fourth segment, and an outer ring surrounding the inner partial couplers.

16. The device of claim 15, further comprising:

a radio frequency (RF) switch comprising:

a common RF port and respective selectable RF ports, respective phase change material junctions coupled to the respective selectable ports, and a controllable heater network comprising respective heating elements that transfer heat to the respective phase change material junctions, the controllable heater network being controlled to output heat via energy pulses to selectively change a first set of one or more of the respective phase change material junctions to a lower resistance state that electrically couples the common RF port to a first group of the respective selectable ports, and to selectively change a second set of the one or more of the respective phase change material junctions to a lower resistance state that electrically decouples the common RF port from a second group of the respective selectable ports.

17. The device of claim 16, wherein the common RF port and the respective selectable RF ports are integrated into the top metallization layer.

18. The device of claim 16, further comprising:

a thermally conductive dielectric layer between the respective phase change material junctions and the respective heating elements.

19. The device of claim 16, wherein, for each quadrature coupler:

the first slot is angled at substantially about forty-five degrees relative to the first microstrip line and the third microstrip line, the second slot is substantially perpendicular to the first slot, the first slot length is greater than the second slot length, and the intersection point of the first slot and the second slot is substantially centered relative to the metallic upper plane, wherein each crossover coupler is associated with a portion of the metal ground plane, and wherein the portion comprises a defined-size cutout area.

20. The device of claim 15, wherein an antenna array is fabricated in the metal layer.

* * * * *